United States Patent
Benckendorf et al.

(10) Patent No.: US 11,592,276 B2
(45) Date of Patent: Feb. 28, 2023

(54) SPATIAL MEASUREMENT SYSTEM FOR AGRICULTURAL APPLICATIONS

(71) Applicant: Precision Planting LLC, Tremont, IL (US)

(72) Inventors: Jared Benckendorf, Tremont, IL (US); Ben L Schlipf, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 17/757,546

(22) PCT Filed: Sep. 28, 2020

(86) PCT No.: PCT/IB2020/059046
§ 371 (c)(1),
(2) Date: Jun. 16, 2022

(87) PCT Pub. No.: WO2021/123936
PCT Pub. Date: Jun. 24, 2021

(65) Prior Publication Data
US 2023/0009710 A1   Jan. 12, 2023

Related U.S. Application Data

(60) Provisional application No. 62/950,538, filed on Dec. 19, 2019.

(51) Int. Cl.
*G01B 3/1005* (2020.01)
*G01B 5/16* (2006.01)

(52) U.S. Cl.
CPC ............. *G01B 3/1005* (2013.01); *G01B 5/16* (2013.01)

(58) Field of Classification Search
CPC ................................ G01B 3/1005; G01B 5/16
See application file for complete search history.

(56) References Cited

U.S. PATENT DOCUMENTS 2,331,662 A   10/1943 Delano
2,361,192 A   10/1944 Goodwin
(Continued)

FOREIGN PATENT DOCUMENTS

| JP | S58 201041 A | 11/1983 |
|---|---|---|
| WO | 0066974 A1 | 11/2000 |
| WO | 0104566 A2 | 1/2001 |

OTHER PUBLICATIONS

UK Intellectual Property Office, Search report for related UK Application No. GB2000177.2, dated Jul. 8, 2020.
(Continued)

*Primary Examiner* — Yaritza Guadalupe-McCall

(57) ABSTRACT

A system for obtaining spatial measurements between objects such as crops in an agricultural field. The system includes a measurement device including a motorized reel containing a wound length of measuring line, and electronic encoder with shaft rotated in opposing directions by dispensing or retrieving measuring line. A pivotably movable spring-biased tension arm maintains tension in the line when being rewound. The tension arm is responsive to changes in line tension and configured to automatically start the motor to rewind the line onto the reel based on angular position of the arm. A gear train includes a translatable shuttle gear which selectively couples the reel to the motor based on movement of the tension arm. The encoder converts rotary motion of its shaft into linear field measurements. In one implementation, the tension arm comprises an inboard arm and outboard arm with translatable pulley coupled thereto by an articulated joint.

24 Claims, 21 Drawing Sheets

(56) References Cited

U.S. PATENT DOCUMENTS

| | | | |
|---|---|---|---|
| 4,186,490 A | 2/1980 | Quenot | |
| 4,768,290 A | 9/1988 | Cooper | |
| 7,103,988 B2* | 9/2006 | Sanoner | G01B 3/11 33/763 |
| 7,665,223 B2* | 2/2010 | Swanson | G01B 7/30 33/701 |
| 8,751,193 B2* | 6/2014 | Swanson | G01B 3/10 702/33 |
| 2006/0175458 A1 | 8/2006 | Ropers et al. | |
| 2009/0313844 A1 | 12/2009 | Swanson et al. | |

OTHER PUBLICATIONS

European Patent Office, International Search Report related to International Patent Application No. PCT/IB2020/059046, dated Dec. 23, 2020.

PogoStick and Research Pogo App Operator's Guide, Jun. 2016.

PogoStick Overview and Quickstart Guide, circa Jun. 2016.

* cited by examiner

SPATIAL MEASUREMENT SYSTEM FOR AGRICULTURAL APPLICATIONS

BACKGROUND

The present invention relates generally to systems for performing spatial measurements between objects, and more particularly to a system and related device suitable for obtaining spatial measurements of crops in agricultural fields.

Consistency of plant spacing in crop rows is an important aspect of the agricultural arts. Immature plants or seed are typically planted by motorized planting vehicles, which can lead to inconsistency in spacing. Proper spacing between plants in the row ensures that each plant receives the necessary amount of sunlight, nutrients, air circulation to ward off fungal diseases, and room to mature. Lateral spacing between adjacent crop rows of plants is therefore also important for the same reasons. Accordingly, proper plant spacing contributes positively to the health and vigor of the plants, and ultimately maximizes the crop yield and quality of the produce.

Improvements in devices suitable for accurately and reliably measuring plant spacing in the planted agricultural field are desired.

BRIEF SUMMARY

Provided is a portable system, device, and related methods/processes for accurately and reliably measuring the spacing between plants in a crop row or between rows of plants in the agricultural field.

The spatial measurement device of the system in one embodiment may include a support frame comprising plural components mounted thereto. The components of the measurement device may be generally organized and arranged on the frame by function into a first storage area or portion, a second windup area or portion, and a third measurement area or portion. The storage portion of the measurement device includes a rotatable spool or reel around which a length of a flexible long and slender measuring member is wound. In one non-limiting embodiment, the measuring member may be a length of a generally non-rigid and preferably non-elastic measuring line (e.g. woven cord or string) having a flexible structure capable of being wound greater than 360 degrees around the reel and other components of the system. In one non-limiting embodiment, the measuring line may preferably have a circular cross section which provides optimum and smooth operation of the measurement device with minimal drag when dispensing or retrieving the line.

The windup portion comprises an automatically self-adjusting tension mechanism configured and operable to maintain tension on the measuring line to keep it taut as it is wound onto or out from the reel during use. Operation of the reel and tension mechanism are further controlled by a gear mechanism comprising a plurality of selectively intermeshing gears and a gear motor, as further described herein.

The measurement portion comprises at least one fixed pulley, a guide element, and an electronic rotary encoder comprising a shaft around which the measuring line is wound which rotates the encoder shaft as the measuring line is paid out from or wound up onto the reel. The encoder circuitry and an operably and communicably linked microprocessor-based controller of the system are configured to translate incremental rotary motion of the shaft detected by the encoder into physical linear distance measurements between plants obtained by the user with the measuring line.

The support frame of the measurement device is configured for mounting to a hand-held portable support structure for use in obtaining plant measurements in the field. The controller may be mounted to the support structure as well providing a complete measurement tool.

Although the present spatial measurement system and device may be described herein with reference to agricultural applications, the system is expressly not limited in its applicability to such agricultural-related uses alone. Accordingly, the spatial measurement system device may be readily adapted for use in numerous other applications to quantify distance measurements between objects of any type unrelated to agricultural applications.

In one aspect, a system for measuring spatial relationships between objects comprises: a frame; a reel rotatably mounted to the frame; a length of a flexible measuring line wound around the reel, the reel rotatable in opposing direction to rewind or pay out the measuring line; a measurement assembly comprising at least one fixed pulley and an encoder comprising an encoder shaft, the measuring line extending around the at least one fixed pulley and encoder shaft in operable engagement; and a self-adjusting tension mechanism arranged between the reel and measurement assembly, the tension mechanism engaging the measuring line and movable to maintain tension on the measuring line when the measuring line is rewound onto the reel.

In another aspect, a system for measuring spatial relationships between objects comprises: a vertical centerline; a frame; a reel rotatably mounted to the frame; a length of a flexible measuring line wound around the reel, the reel rotatable in opposing direction to retrieve the measuring line or dispense the measuring line on demand; a measurement assembly comprising at least one fixed pulley and an encoder comprising an encoder shaft, the measuring line wrapped around the at least one fixed pulley and encoder shaft in operable engagement therewith; and a movable self-adjusting tension arm assembly arranged between the reel and measurement assembly in a measuring line routing path, the tension arm assembly comprising an inboard arm pivotably mounted to the frame and an outboard arm pivotably coupled to inboard arm at an articulated joint and movable relative thereto; the tension arm assembly comprising a translatable pulley mounted to and movable with the outboard arm; a fixed tension pulley cooperating with the tension arm assembly and mounted to the frame; a first spring biasing the tension arm assembly in a direction away from the encoder; the measuring line extending from the at least one fixed pulley of the measurement assembly to the translatable pulley or the fixed tension pulley; wherein the tension arm assembly is movable in a plurality of positions dependent upon variations in tension of the measuring line when the measuring line is retrieved by the reel. In some embodiments, the system further comprises a gear clutch mechanism including: a motor having a rotating motor gear; the reel having a reel gear; and the inboard arm having a shuttle gear movable therewith and selectively engageable with both the motor gear and reel gear depending on movement of the tension arm assembly; wherein moving the tension arm assembly in a first direction engages the shuttle gear with the motor and reel gears causing the reel to rotate via motor power for retrieval of a the measuring line; and moving the tension arm assembly in an opposite second direction disengages the shuttle gear from the motor and reel gears stopping the reel and the retrieval of the measuring line.

In another aspect, a method for maintaining tension in a distance measuring device comprises: providing a measurement device comprising a frame including a rotatable reel around which a length of a measuring line is wound, a motor comprising a motor gear selectively coupleable to a reel gear for rotating the reel, an encoder comprising an encoder shaft, and a pivotably movable spring-biased tension arm assembly; routing the measuring line in order from the reel and operably engaging a translatable pulley mounted to the tension arm assembly, a fixed tension pulley mounted to the frame, and the encoder shaft; moving the measurement device in a first linear direction; applying a first tension force to the measuring line; unwinding measuring line from the reel which rotates in a first feed direction; rotating the tension arm assembly in a first direction towards the encoder in response to the first tension force; moving the measurement device in a second linear direction opposite to the first linear direction which decreases the first tension force; automatically rotating the tension arm assembly in a second direction away from the encoder via spring force in response to decreasing the first level of tension; coupling the motor gear to the reel gear; and rotating the reel in a second rewind direction via operation of the motor to retrieve measuring line.

In another aspect, a method for maintaining tension in a distance measuring device comprises: providing a measurement device including a rotatable reel around which a length of a measuring line is wound, a motor comprising a motor gear selectively coupleable to a reel gear for rotating the reel, an encoder comprising an encoder shaft operably engaging the measuring line, and a pivotably movable spring-biased tension arm assembly operably engaging the measuring line; pulling a length of measuring line from the reel, wherein a first tension force is created in the measuring line acting in a line feed direction; forming slack in the measuring line which decreases the first tension force; rotating the tension arm assembly in a line retract direction opposite to the line feed direction; the tension arm assembly creating a second tension force in the measuring line; activating a motor operably coupled to the reel via rotating the tension arm assembly; and rewinding measuring line back onto the reel via motor power.

Further areas of applicability of the present invention will become apparent from the detailed description provided hereinafter.

BRIEF DESCRIPTION OF THE DRAWINGS

The present invention will become more fully understood from the detailed description and the accompanying drawings, wherein like elements are labeled similarly and in which.

Figure 1:
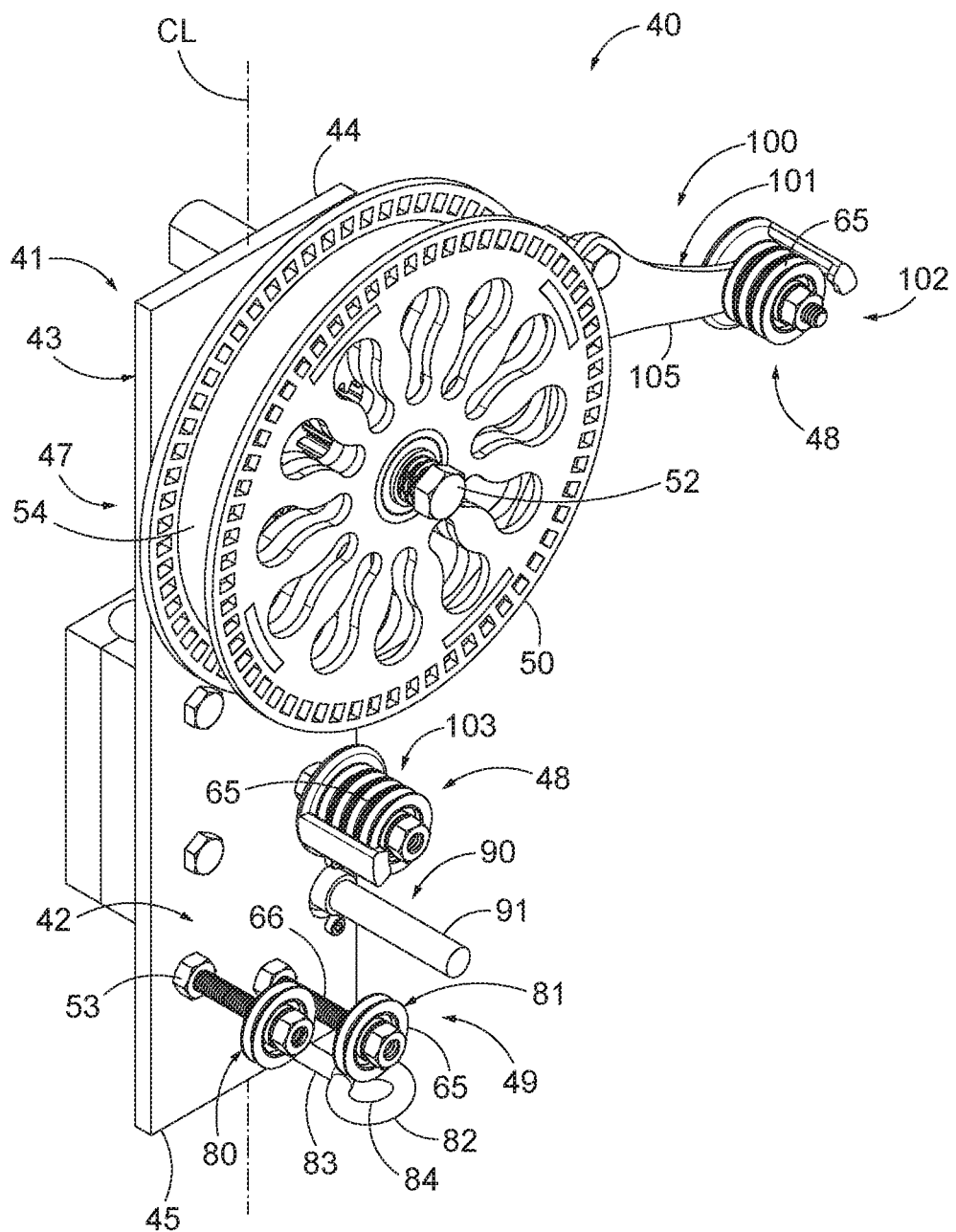
FIG. 1 is a front perspective view of a measurement device of a spatial measurement system according to the present disclosure.
Figure 2:
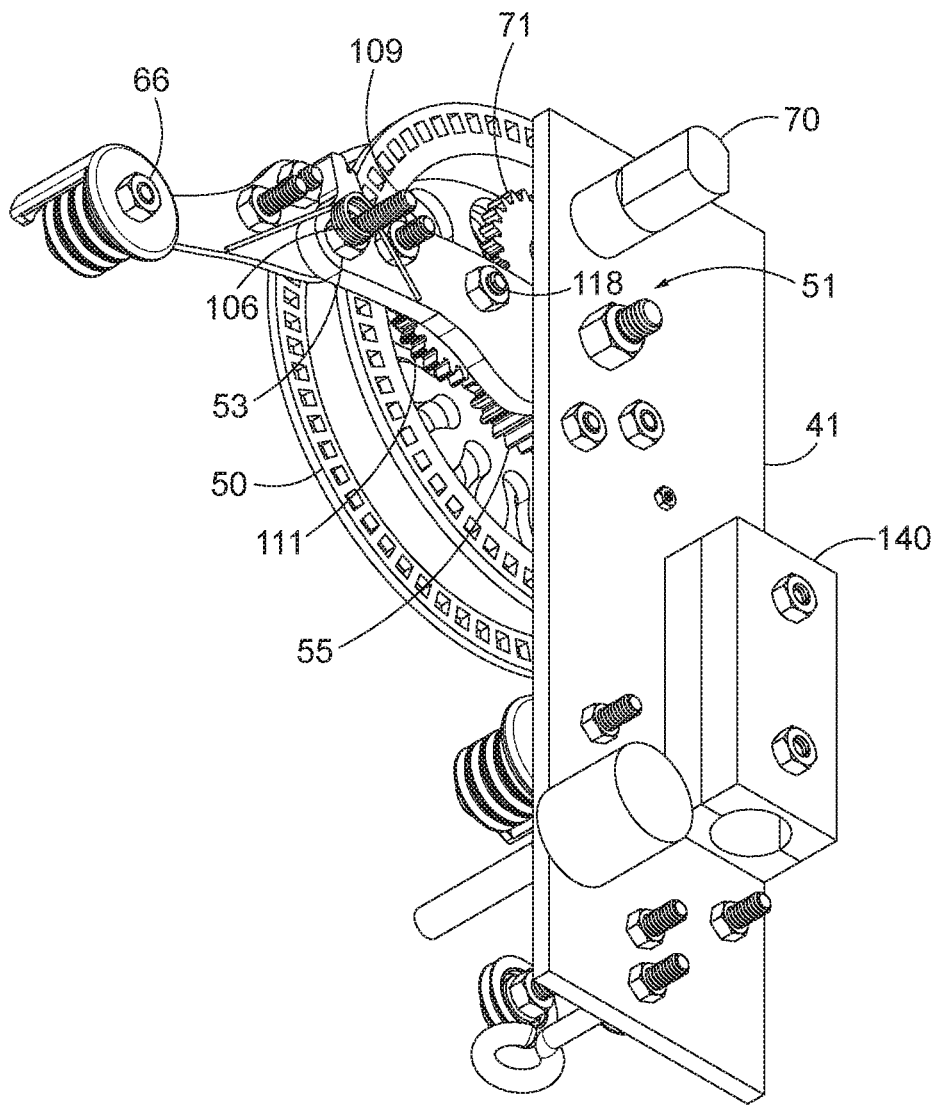
FIG. 2 is a rear perspective view thereof.
Figure 3:
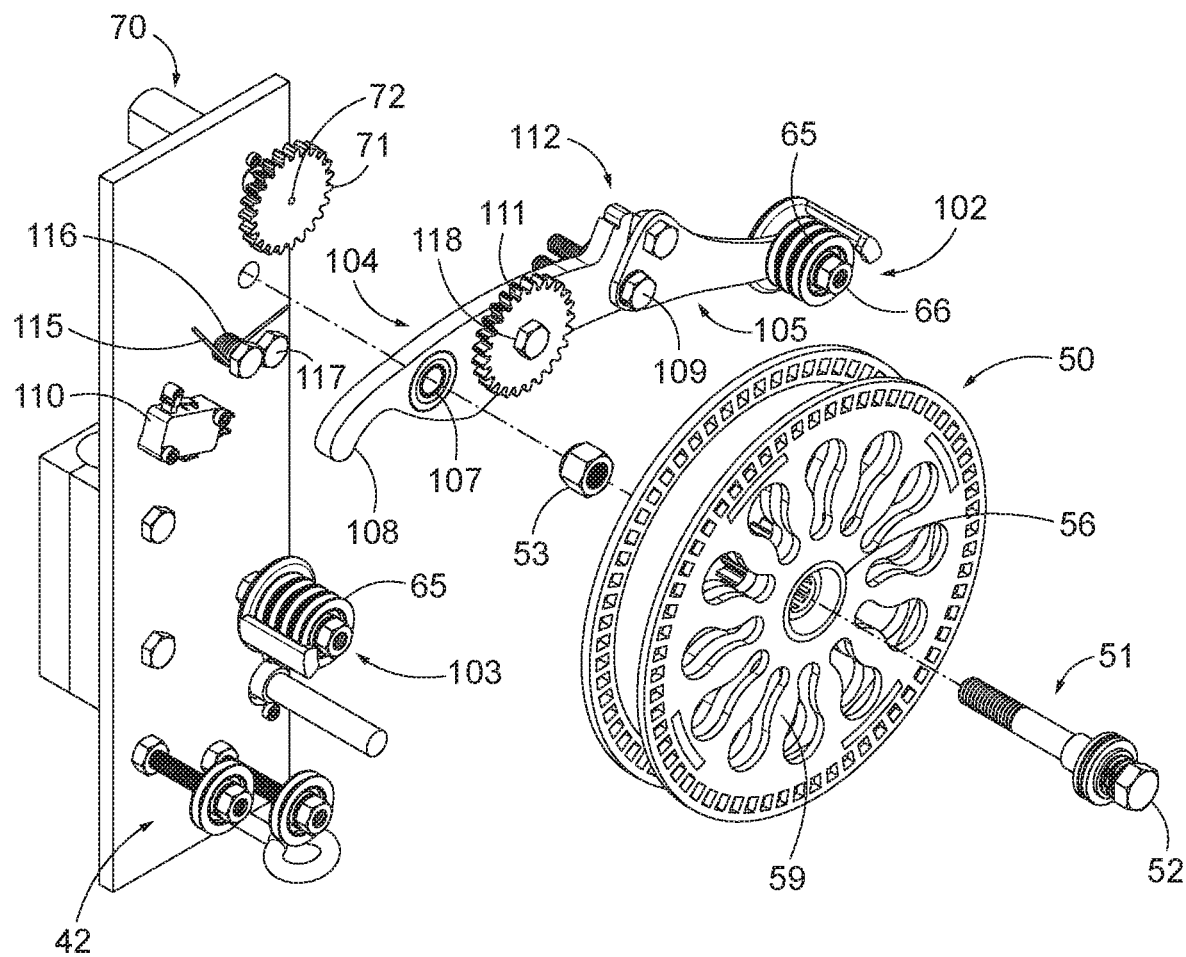
FIG. 3 is a front exploded perspective view thereof.
Figure 4:
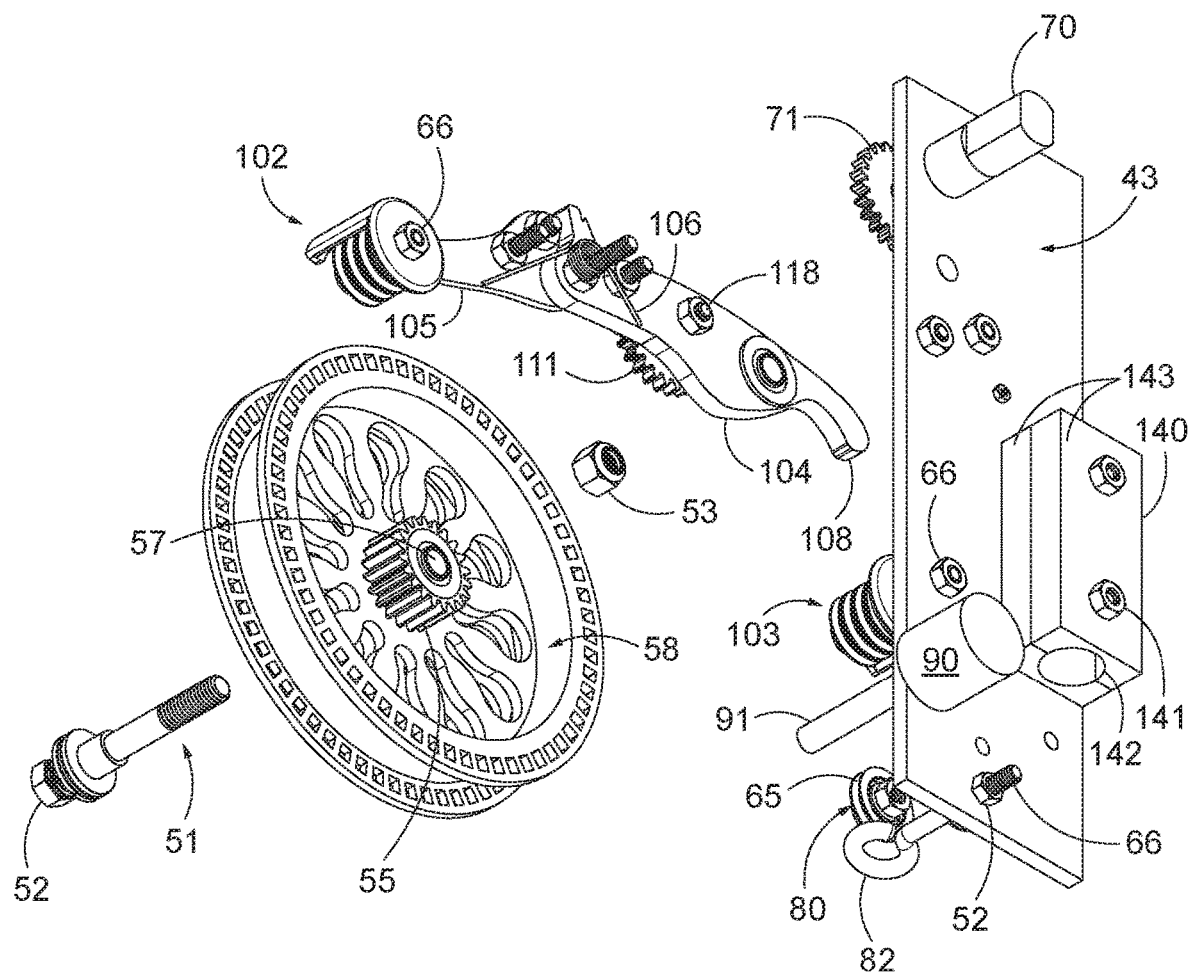
FIG. 4 is a rear exploded perspective view thereof.
Figure 5:
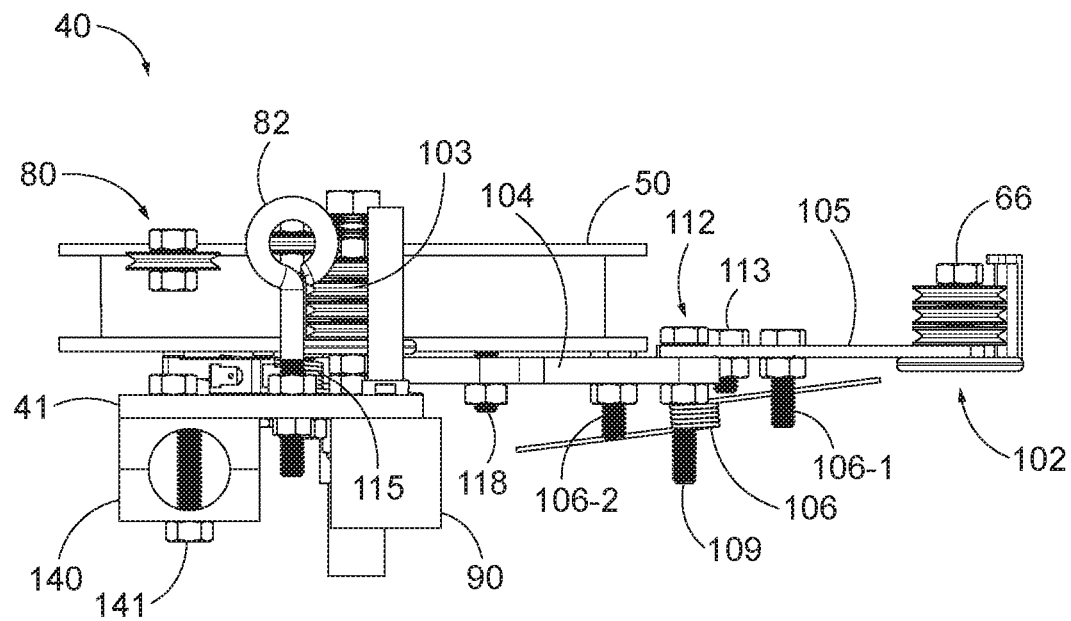
FIG. 5 is a top plan view thereof.
Figure 6:
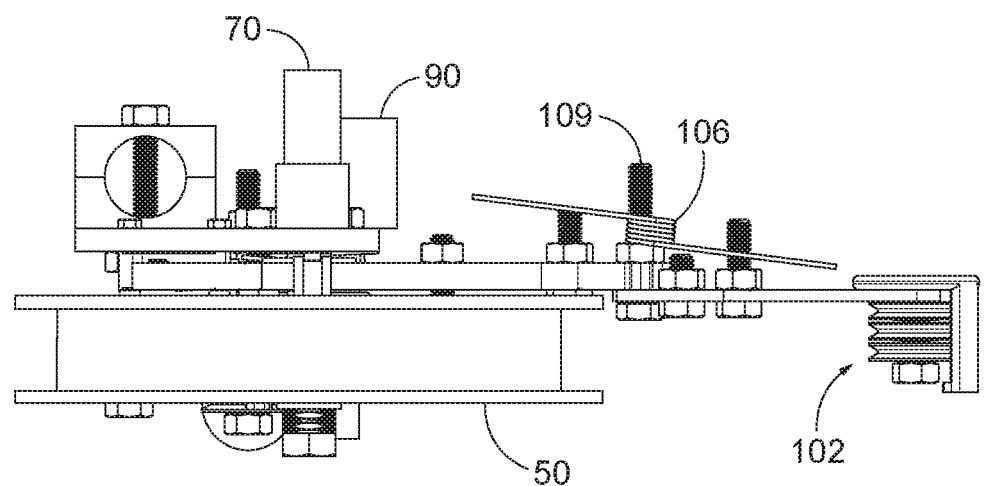
FIG. 6 is a bottom plan view thereof.

All drawings are schematic and not necessarily to scale. Components numbered and appearing in one figure but appearing un-numbered in other figures are the same unless expressly noted otherwise.

DETAILED DESCRIPTION

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

FIGS. 1-14 show a spatial measurement system 20 including a spatial measurement device 40 according to the present disclosure. Measurement device 40 includes a support frame 41 and defines a vertical centerline CL passing through the geometric center of the frame. Centerline CL defines an axial direction for reference purposes. Transverse directions are defined herein as perpendicular or oblique to centerline CL for reference purposes.

Frame 41 forms the backbone for mounting and supporting the various components of the measurement device, further described herein. In one embodiment, frame 41 may comprise a vertically elongated rectangular flat plate defining opposing front and rear major surfaces 42, 43 extending between a top end 44 and bottom end 45. A pair of laterally spaced apart peripheral side edges 46 extends between the top and bottom ends. The body of frame 41 may have a rectilinear configuration as shown; however, other polygonal and non-polygonal shaped plates may be used. In other embodiments, frames of other types instead of plates may be used. The configuration and type of frame used does not limit the invention.

Components of the measurement device 40 may be organized and arranged into functional portions on frame 41. The functional areas of measurement device 40 generally include a storage portion 46 at top, measurement portion 49 at bottom, and windup portion 47 therebetween. For convenience of description, the components in each portion will first be described separately.

With continuing reference to FIGS. 1-14, the storage portion 47 of measurement device 40 generally comprises a storage reel 50 rotatably mounted to the frame by shaft 51. Reel 50 may be mounted on the front major surface 42 of frame 41. Shaft 51 defines an axis of rotation transversely oriented to vertical centerline CL. Shaft 51 includes a diametrically enlarged tooling head 52 (e.g. hex or other) at one end and may be at least partially threaded at an opposite end to receive nut 53. A threaded bolt may conveniently be used for shaft 51 in one embodiment as shown.

Reel 50 may have any suitable configuration and dimensions. Reel 50 has a generally circular body defining a circumferentially-extending annular spooling surface 54 for securing and winding a length of the measuring member 60 around. Reel 50 comprises a central hub opening 56 defined by an optional spoked hub 59 comprising a plurality of radially extending spokes for weight reduction. In one embodiment, reel 50 may have a diameter larger than the lateral width of frame 41 (measured between its lateral edges 46), and may be mounted offset from the vertical centerline CL of the frame.

Reel 50 is rotatable in a first direction to windup and retrieve the measuring member, and an opposite direction for dispensing or paying out the measuring member during the process of obtaining distance measurements between plants.

Reel 50 further comprises a toothed reel gear 55 arranged at the center of reel body around central hub opening 56 which receives shaft 51 therethrough. Gear 55 includes a central opening 57 concentrically aligned with hub opening 56. Gear 55 is arranged on the rear side of reel 50 (facing frame front major surface 42). Gear 55 may be integrally formed with the reel body as a unitary structural part thereof, or alternatively may be a discrete component rigidly affixed to the gear body by any suitable mechanical method (e.g. welding, soldering, adhesives, fasteners, keyed joint, interference fit, etc.). In either case, gear 55 rotates in unison with the reel 50; there being no relative motion therebetween. In one embodiment, the rear side of reel 50 may be recessed such that the gear 55 is disposed within the rear recess 58 to provide a compact construction with minimal projection of the reel from the support frame 41.

Measuring member 60 may be a length of a generally long slender flexible material in structure capable of being wound greater than 360 degrees around the storage reel 50 and the various other shafts and pulleys described herein. This allows the smallest possible diameter reel, shafts, and pulleys to be used which contribute to the compact construction of the measurement device 40. In one preferred but non-limiting embodiment, the measuring member may be a measuring line 61 having a circular cross section. Such a circular cross-sectional shape is dimensionally non-directional and uniform in all transverse directions. This contrasts to other possible measurement items that could alternatively be used such as bands or tapes having rectilinear cross-sectional shapes, which inherently are dimensionally different in different cross sectional directions (e.g. width and height). Such non-circular shapes may twist as they are paid out or wound up on reel 50, which can adversely impede smooth operation for retrieving the measuring member by creating drag on the system. Conversely, any twisting of a circular cross-sectional length of line or string of any suitable diameter which may occur during use of the measurement device 40 does not suffer the same disadvantages thereby maintaining reliable feeding and retrieval of the measuring line 61 during use.

Any suitable type and diameter of measuring line 61 may be used; the smaller the diameter, the smaller the required size and storage capacity of the reel 50. Suitable measuring lines 61 include strings and cords having two or more strands twisted or woven together. As one non-limiting example, an 8-strand string or cord may be used. The multi-strand string or cord is preferred because it increases friction on the pulley wheels and encoder shaft 91 without substantial slippage for better performance in contrast to monofilament type lines. Preferably, the type of measuring line 61 used should be substantially non-elastic meaning its length does not appreciably change when stretched into a taut condition for obtaining plant spacing measurements. This maintains the accuracy of plant spacing measurements.

Figure 22:
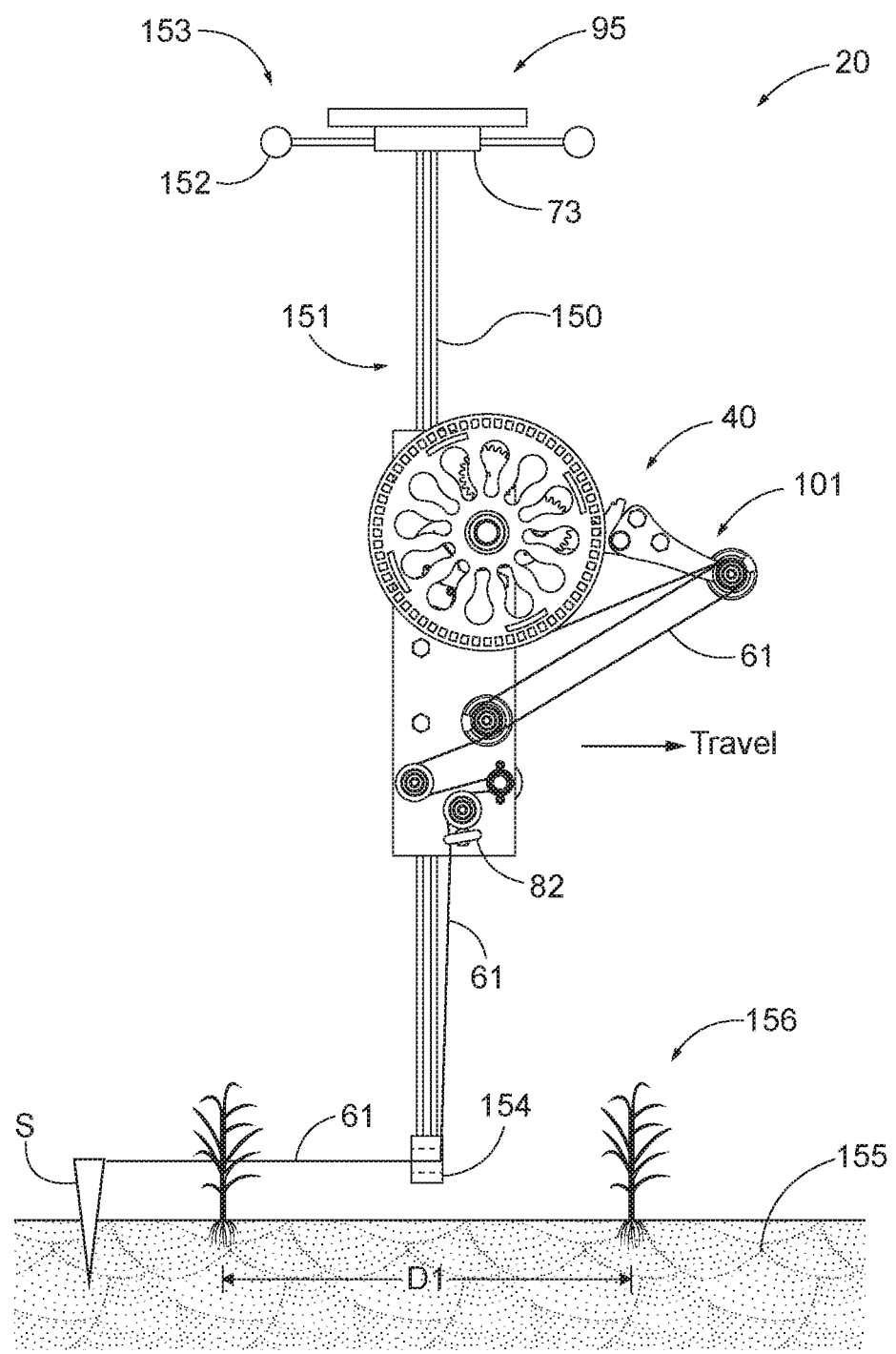
FIG. 22 is side view of hand-held support structure with programmable controller for mounting the measurement device of FIG. 1 to obtain distance measurements between objects.

With continuing reference to FIGS. 1-14, storage portion 47 of measurement device 40 further includes a gear clutch mechanism comprising a plurality of selectively intermeshing gears and a gear motor assembly, all of which controls operation of the reel 50 and tension of the measuring line 61 as further described herein. The gears include reel gear 55, tension arm shuttle gear 111, and a motor gear 71. The motor assembly comprises electric motor 70 and motor gear 71 mounted on motor shaft 72. Motor 70 may be mounted proximate to reel 50 on the rear major surface 43 of frame 41. Gear 71 is mounted on the front major surface 42 and arranged inside rear recess 58 of reel 50 for selective engagement with movable tension arm shuttle gear 111 as further described herein. Motor 70 is preferably electrically connected to an onboard power source 73, such as a rechargeable or disposal battery or batteries, which may be mounted at any convenient location on frame 41 or the hand-held support structure 151 as seen in FIG. 22.

Due to the use of a measuring line 61 of circular cross section, less drag or friction is created on the system. This permits use of a small size, low speed motor such as a 12V DC motor with speed of only a few hundred RPM to be used. Because the motor may be battery powered, the small motor electrical demands advantageously increase battery life between either replacement if disposables are used or recharge if rechargeable batteries (e.g. lithium ion or others) are used as the power source.

The measurement portion 49 of measurement device 40 comprises a measurement assembly including at least one rotatable fixed pulley 80, a guide element 82, and a rotary encoder 90 comprising a rotatable encoder shaft 91 around which the measuring line 61 is wound. The measuring line 61 causes the shaft 91 to rotate as the measuring line 61 is dispensed or alternatively wound back up onto reel 50. The encoder circuitry and an operably and communicably linked microprocessor-based programmable controller 95 of the spatial measurement system 20 (see, e.g. FIG. 22) are cooperatively configured via circuit layout and/or software to translate incremental rotary motion of the shaft detected by the encoder 90 into physical linear distance measurements between plants obtained by the user. The encoder module may be mounted on the rear major surface 43 of frame 41. Encoder shaft 91 extends through the frame and projects forwardly beyond the front major surface 42 of the frame as shown for wound engagement by the measuring line 61.

To create positive and reliable engagement of measuring line 61 with the encoder shaft 91, the measuring line is preferably wound around the shaft at least 360 degrees. In one preferred but non-limiting embodiment, it was discovered during testing of the measurement device prototype that approximately 540 degrees of wound engagement between shaft 91 and the measuring line 60 provided optimum and reliable measurement results. The number of wraps around the encoder shaft 91 will depend on the type of shaft material used with respect to its coefficient of friction and type of material used for the measuring line 61. Accordingly, the ideal number of times the measuring line is wound around the encoder shaft may vary based on these factors.

Figure 7:
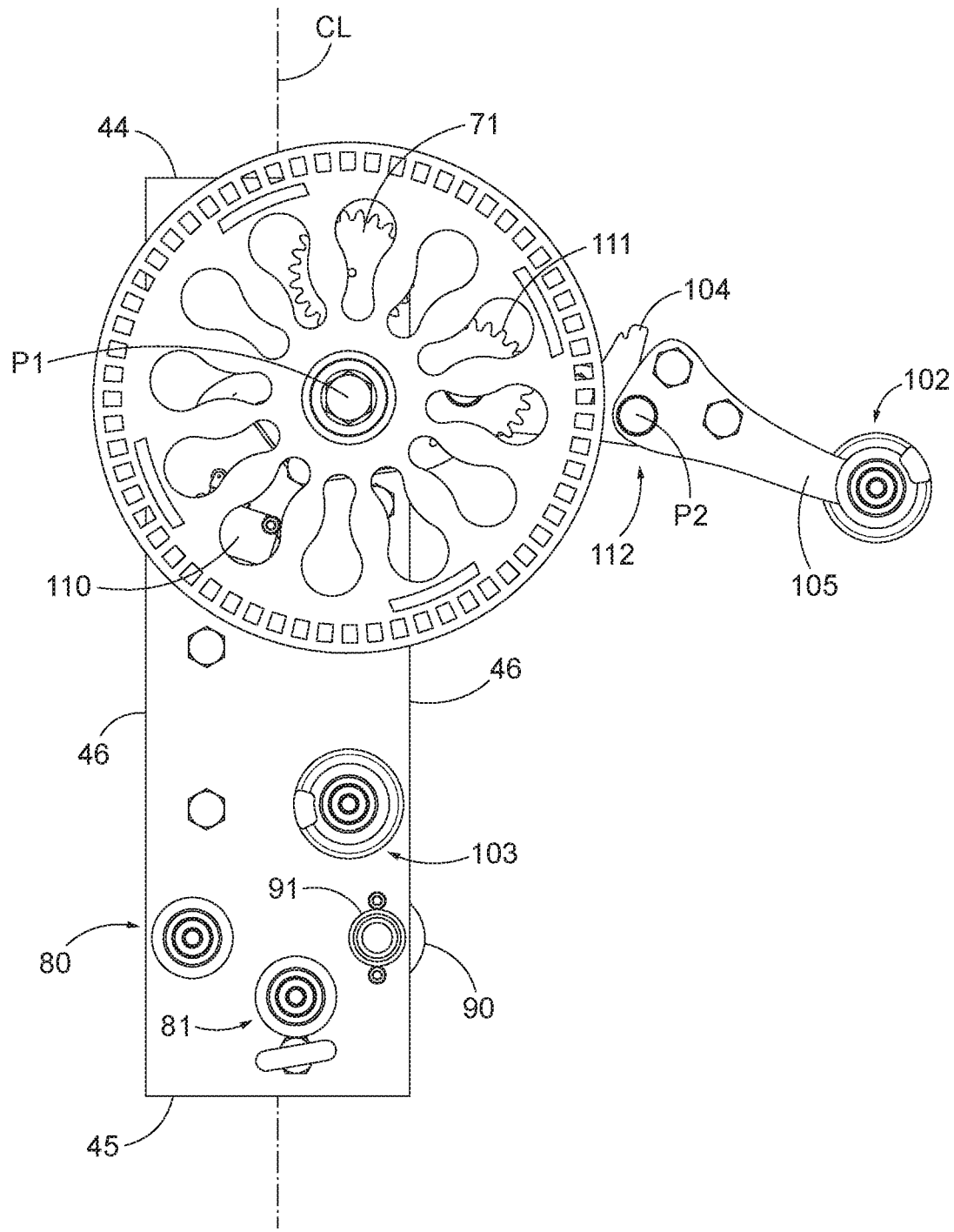
FIG. 7 is a front view thereof.
Figure 8:
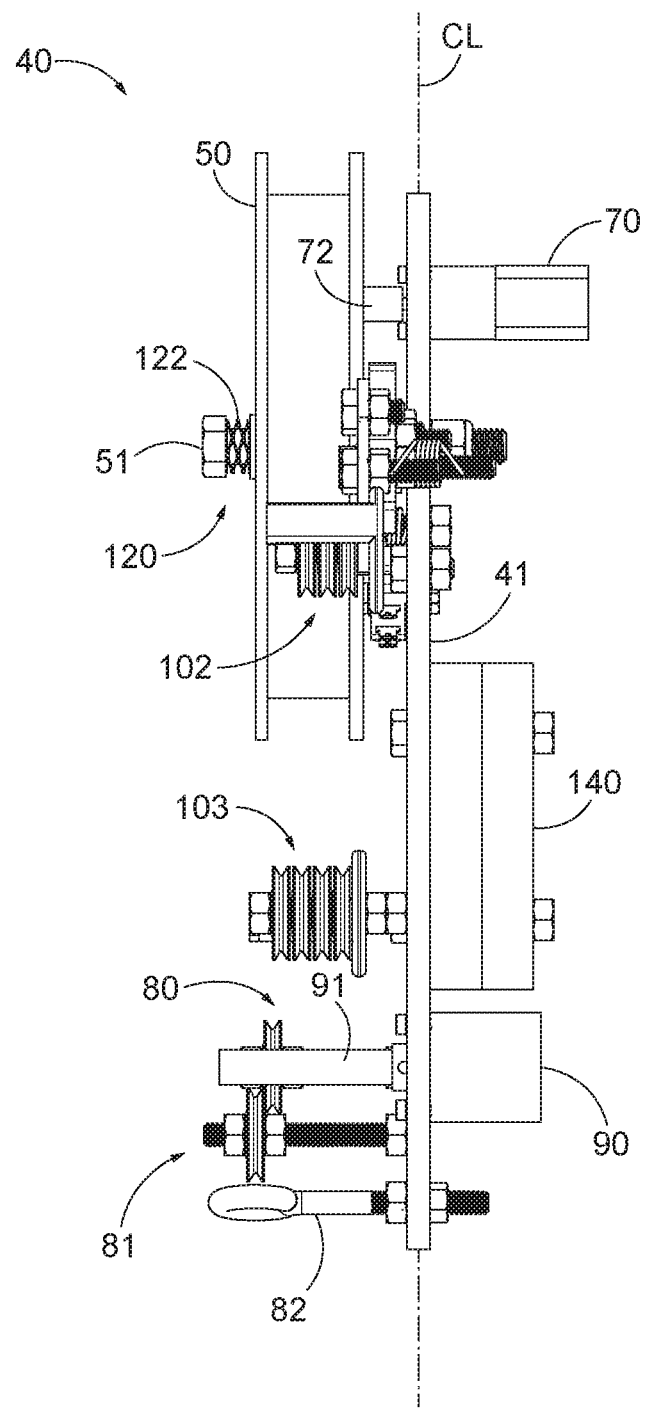
FIG. 8 is a right side view thereof.
Figure 9:
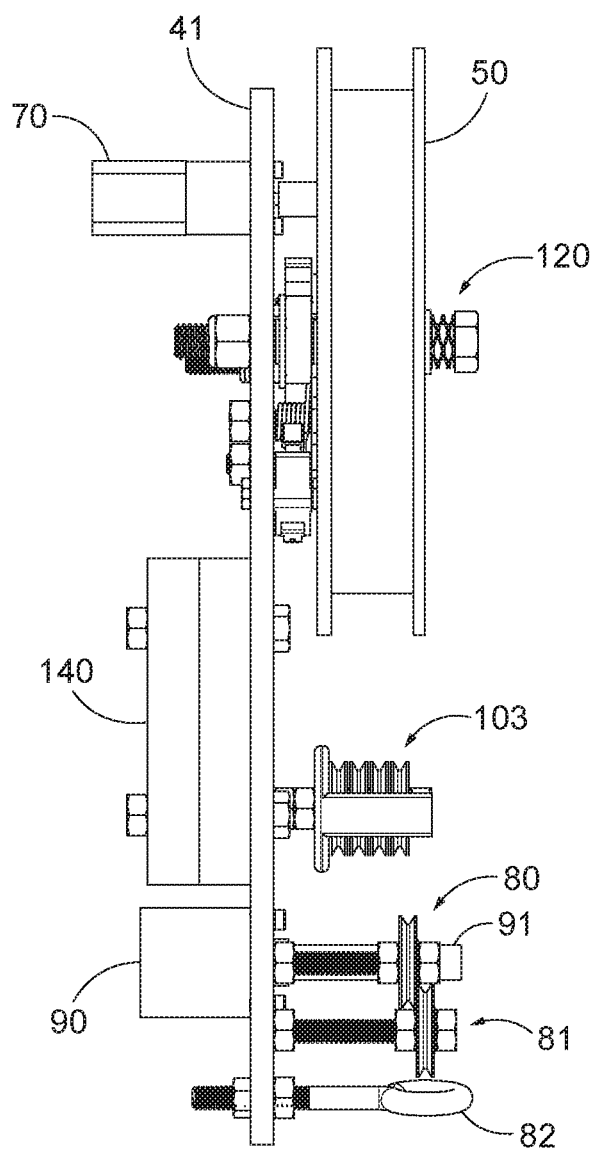
FIG. 9 is a left side view thereof.
Figure 10:
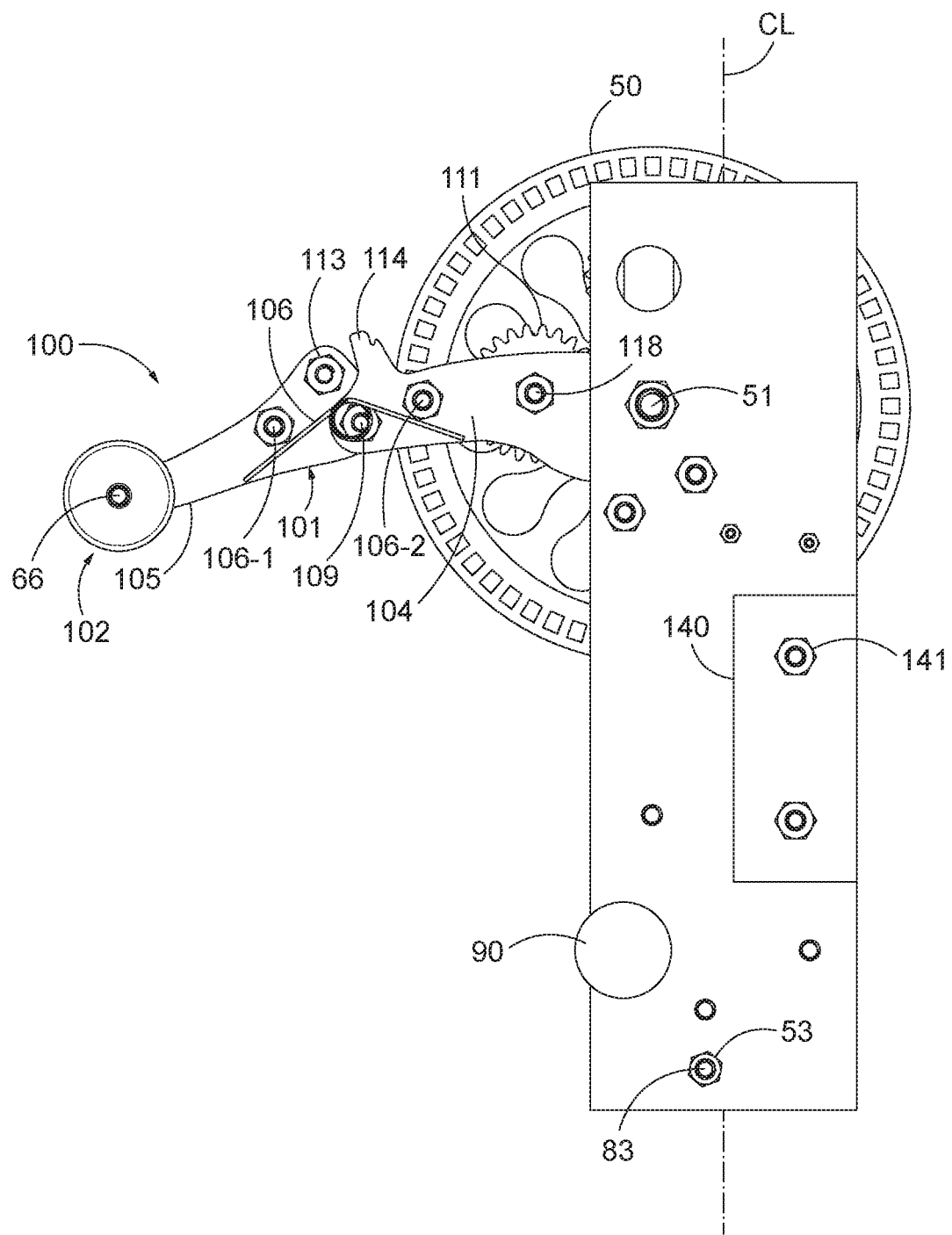
FIG. 10 is a rear view thereof.
Figure 11:
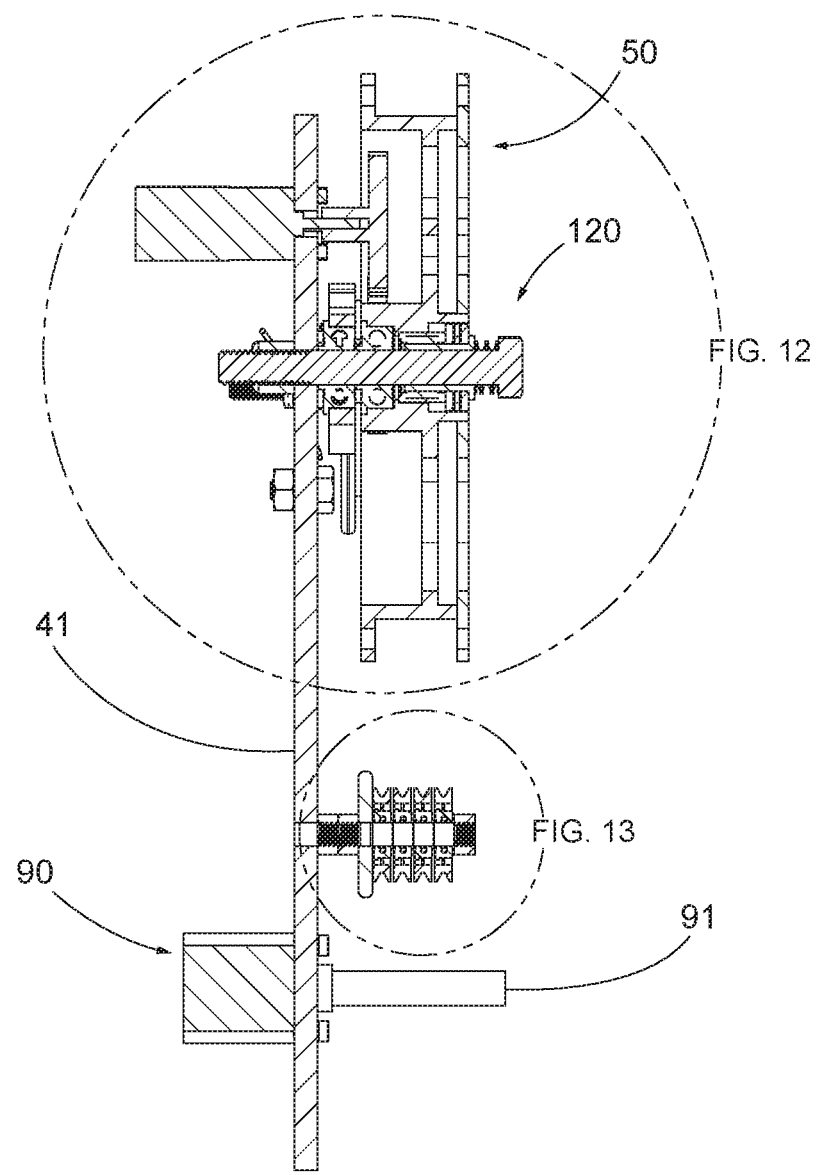
FIG. 11 is a side cross-sectional view thereof.

Fixed pulley 80 may be substantially laterally/horizontally aligned with encoder shaft 91 (best shown in FIG. 7). Pulley 80 is adjacent to one lateral edge 46 (left edge in this figure) of frame 41 and encoder shaft 91 is adjacent to the opposite lateral edge 46 (right edge). In one embodiment, an additional rotatable fixed pulley 81 may be provided to change direction of the measuring line 61 from horizontal to vertical. Pulley 81 is located adjacent to and above guide element 82 in vertical alignment. The fixed pulley 81 and guide element 82 may be arranged below and vertically between the fixed pulley 80 and encoder shaft 91 as shown. Pulleys 80, 81 and encoder shaft 91 may form a generally triangular arrangement pattern in one embodiment. However, these elements may be arranged in other patterns in other embodiments and are not limited to the illustrated positions.

Guide element 82 may be any suitable device configuration for feeding line outwards from or retrieving line into the measurement device 40. In one embodiment, the guide element 82 may be an eye hook mounted to the frame 41 via its threaded shank of 83 and a nut 53 from the rear major surface 43 of the frame. The open "eye" or aperture 84 of the eye hook is disposed on the opposite front major surface 42 of the frame. In the illustrated embodiment, the eye hook is oriented to feed or retrieve the measuring line 61 in a direction parallel to vertical centerline CL of the measurement device 40. Other orientations and feed directions may be used. In some embodiments, the guide element may be omitted and the last fixed pulley 81 in the measuring line routing path P may served as the guide element.

Each fixed pulley 80, 81 is an assembly comprising a single pulley wheel 65, threaded stud or shaft 66, and threaded nuts 53. The shafts have a length sufficient to elevate and spaced the pulley wheels apart from the front major surface 42 of support frame 41 as shown.

The windup portion 48 of measurement device 40 comprises an automatically self-adjusting tension mechanism 100 configured and operable to maintain tension in the measuring line 61 keeping it taut as it is wound onto or out from the reel 50 during use to obtain plant spacing measurements. Tension mechanism 100 may be arranged between reel 50 and measurement portion 49.

The tension mechanism 100 generally includes a fixed tension pulley 103 mounted to frame 41 and a spring biased tension arm assembly 101 comprising a vertically and laterally translatable pulley 102. Pulleys 102 and 103 are operably engaged by the measuring line 61 and arranged in the measuring line routing path P between the reel 50 and fixed pulley 80 of the measurement assembly. Fixed tension pulley 103 is arranged in the measuring line routing path P between fixed pulley 80 and the translatable pulley 102. Pulley 103 may be substantially vertically aligned with the mounting shaft 51 of reel 50 in some embodiments as illustrated. Pulleys 102 and 103 functionally maintain tension in the measuring line 61 and may also be considered tension pulleys for reference.

The translatable and fixed tension pulleys 102, 103 may each preferably comprise a linear stack of adjacent pulley wheels 65. Each wheel may ride on a ball bearing 119-1 arranged on a threaded stud or shaft 66. Bolts with enlarged tooling heads may be used for the shafts as shown. One or more threaded nuts 53 are provided to both secure the wheel and set a preselected distance away from support frame 41 as needed (best example shown in FIG. 13) so that pulley wheels 65 are substantially in alignment on each of the pulley wheels of pulleys 102, 103 (see, e.g. FIGS. 5 and 8) for routing the measuring line 61 back and forth around the pulleys. At least two pulley wheels 65 are provided in each stack. In one non-limiting embodiment as shown, fixed tension pulley 103 may have three pulley wheels and translatable pulley 102 may have four pulley wheels. Other numbers of pulley wheels may be used in other implementations. The measuring line 61 may be wound around at least two pulleys in each stack traveling back and forth between the pulleys 102 and 103 in loops (see, e.g. FIG. 14).

Multiple pulley wheels stacked on the tension pulleys 102, 103 provide several important advantages. First, the multiple loops or passes of the measuring line 60 back and forth around the several pulley wheels in each pulley divides and reduces the tension in the measuring line somewhat analogous to a block and tackle arrangement. Accordingly, less effort is required to deploy the measuring line while it is maintained in a taut condition for performing in-field plant spacing measurements by the self-adjusting spring tension arm assembly 101. In addition, lowering the tension in the measuring line 61 reduces the power output required for motor 70 allowing a smaller capacity and size motor to be used. Second, the extra loops or passes of measuring line 61 between the translatable pulley and fixed pulley 102, 103 allows an extra length of line to be spooled around the pulleys. This allows more measuring line 60 to be retracted into measurement device 40 after measurements are finished without having to actuate the motor to wind the line up onto the reel 50. This increases battery life. In addition, if the user moves slightly back and forth by a few feet when making measurement adjustments, the motor also will not actuate with the extra length of measuring line 61 spooled between the translatable pulley 102 and fixed tension pulley 103.

Tension arm assembly 101 comprises a first inboard tension arm 104 pivotably coupled to the frame 41 and a second outboard tension arm 105 at an articulated joint 112. Outboard arm 105 is pivotably coupled to the inboard arm via pivot shaft 109 at the joint and movable relative thereto. In one embodiment, a bolt may be used for pivot shaft 109 and fastened in place via threaded nuts 53. Arms 104, 105 may each have elongated bodies. Translatable pulley 102 is mounted to the outermost distal end of the outboard arm 105. The innermost proximal end of arm 105 is coupled to the outermost distal end of the inboard arm 104. The portion of inboard arm 104 closest to its innermost proximal end is coupled to frame 41.

The inboard arm 104 may be pivotably mounted to frame 41 between the frame and the reel 50. In one embodiment, inboard arm 104 may be mounted to frame 41 via the same mounting shaft 51 of reel 50. The portion of inboard arm 104 closest to its proximal end defines mounting aperture 107 which receives reel shaft 51 therethrough. Accordingly, both the inboard arm and reel share a common mounting axis of rotation defined by shaft 51. This provides an efficient use of components and facilitates assembly of the measurement device 40. In other possible embodiments, however, inboard arm 104 may be mounted to the frame by a separate shaft.

The proximal end of inboard arm 104 is configured to define an elongated laterally inward projecting actuating extension 108 which cooperates with and is selectively engageable with a motor actuator 110 operable for intermittently starting and stopping the motor 70. This intermittent operation conserves and extends onboard battery life. In one embodiment, actuating extension 108 may have an arcuately curved shape angled to make contact with the actuator 110. Actuator 110 may be mounted to frame 41 behind reel 50 in one embodiment. Actuating extension 108 is selectively engageable with actuator 110 depending on movement of the tension arm assembly 101 relative to the frame 41, as further described herein. In one embodiment, actuator 110 may be a sensor such as without limitation a mechanical switch operably coupled to the motor power circuit. However, other types of sensors may be used for actuator 110 to initiate and terminate operation of the motor including for example without limitation Hall effect or other proximity sensors, and other types of displacement sensors; all of the foregoing switches and sensors being commercially available. The type of sensor or switch used to control operation of motor 70 does not limit the invention.

The inboard arm 104 of tension arm assembly 101 includes the movable shuttle gear 111 of the gear train previously mentioned which translates in an arcuate path with movement of the inboard arm 104. Gear 111 is selectively engageable with motor gear 71 depending on movement and position of the tension arm assembly 101, as further described herein. In one embodiment, gear 111 may be continuously engaged and meshed with the reel gear 55 at all times. Gear 111 is freely rotatably mounted to inboard arm 104 and will not rotate the reel 55 to rewind measuring line 61 unless gear 111 is engaged and driven by the motor gear 71. Gear 111 may be mounted on gear shaft 118 arranged between mounting aperture 107 of inboard arm 104 and the articulated joint 112 between the inboard and outboard arms. A bolt may be used for gear shaft 118 as shown, which can be secured to inboard arm 104 via a nut 53.

Tension arm assembly 101 is movable between a partially collapsed and inward-most position proximate to the frame 41, and an outward-most fully extended position distal to the frame. The tension arm assembly 101 is further movable between a plurality of articulated positions therebetween in which the inboard and outboard arms 104, 105 assume a variety of angular positions relative to each other and the frame 41. In the outward-most position, the translatable pulley 102 is farthest from frame 41 and closest to the frame when in the inward-most position. The positions of tension arm assembly 101 are further described below in conjunction with operation of the measurement device 40.

A joint spring 106 is arranged at articulated joint 112 between the inboard and outboard arms 104, 105. Spring 106 acts on and biases the arms towards a fully extended position relative to each other in which each arm is erect and substantially inline (see, e.g. FIG. 10). Spring 106 further biases outboard arm towards motor 70 and away from fixed tension pulley 103 and the encoder 90. This counteracts the tension force in the measuring line 61 when the measurement device 40 is being used to collect in-field measurement which pulls the line in an opposite direction towards the encoder 90. In one embodiment, spring 106 may be a helical torsion spring with the central coil disposed around pivot shaft 109. One leg of spring 106 engages spring protrusion 106-1 on outboard arm 105 and the remaining leg engages spring protrusion 106-2 on inboard arm 104 (best shown in FIG. 10). Outboard arm 105 includes a protruding travel stop 113 which selectively engages a stop surface 114 formed on inboard arm 104 proximate to the distal end of arm at the joint 112. The travel stop 113 limits the fully extended position of tension arm assembly 101 against the biasing action of spring 106. A bolt and nut combination may be used for travel stop 113 in some embodiments as shown.

A second inboard arm spring 115 independently biases inboard arm 104 towards an erect position away from fixed tension pulley 103 and encode shaft 91; the entire arm assembly therefore being biased away from pulley 103 in turn. Spring 115 may be a helical torsion spring having the coil mounted to a spring protrusion 116 on frame 41, one leg 115 engages a second adjacent spring protrusion 117 on the frame 41, and the remaining leg engages the inboard arm 104.

The tension arm assembly 101 is operable to maintain a substantially uniform tension in the measuring line when the measuring line is being retrieved by the reel as further described herein.

According to another aspect of the measurement device 40, a reel clutch mechanism 130 is provided within the central hub opening 56 of the reel 50. The reel clutch mechanism 130 allows the user to manually adjust and select an appropriate tension force setpoint for reel, which sets the drag for the reel that must be overcome by the actual tension created in the measuring line 61 during use of the measurement device in order to rotate the reel and pull a length of the measuring line out from the reel.

Figure 12:
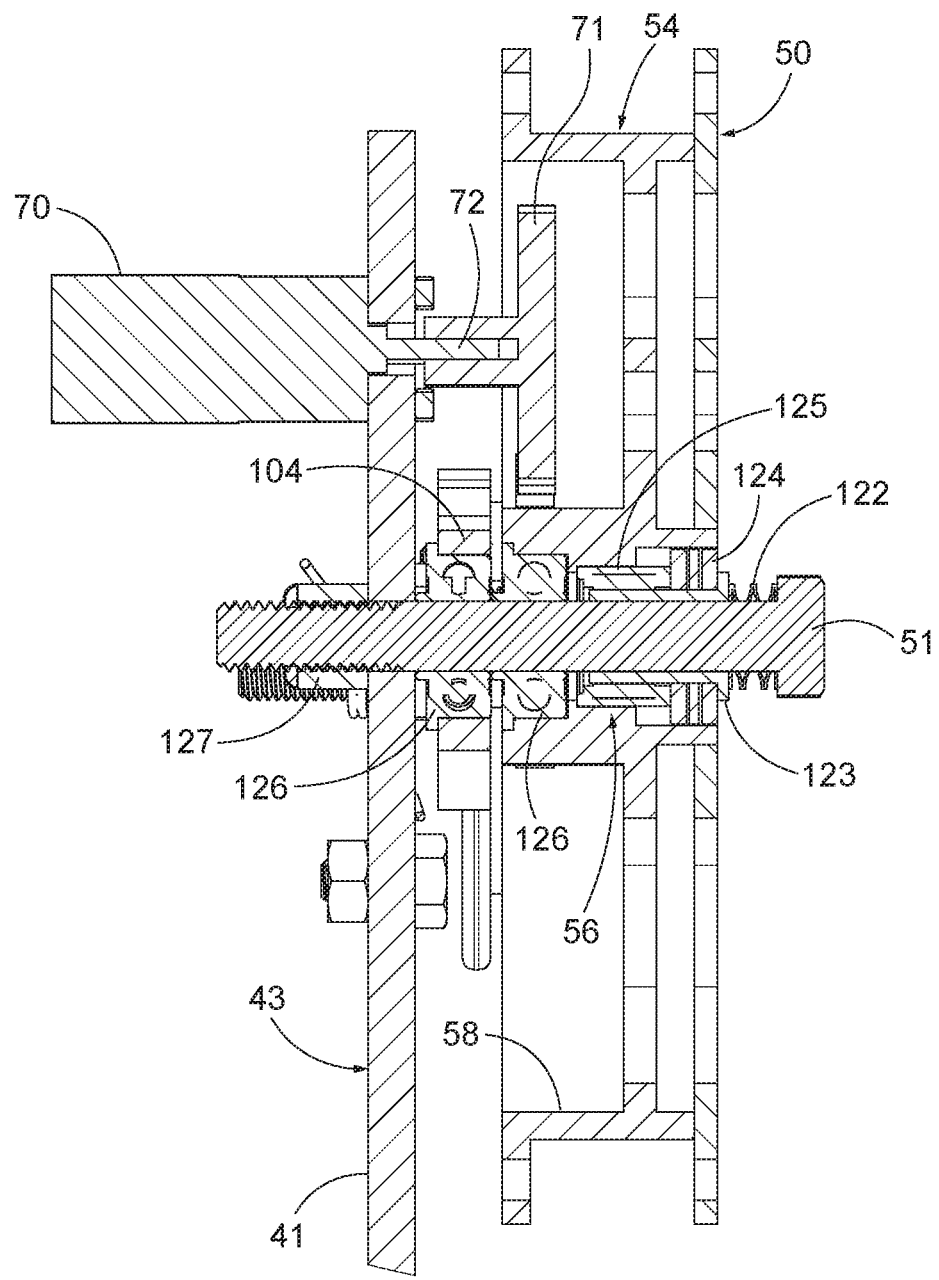
FIG. 12 is an enlarged detail view from FIG. 11.
Figure 13:
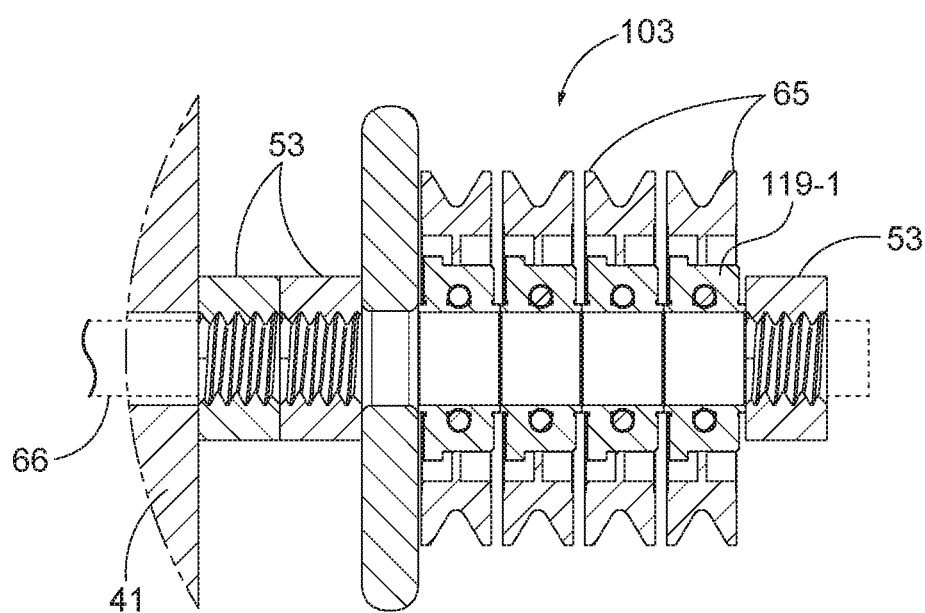
FIG. 13 is an enlarged detail view from FIG. 11.
Figure 21:
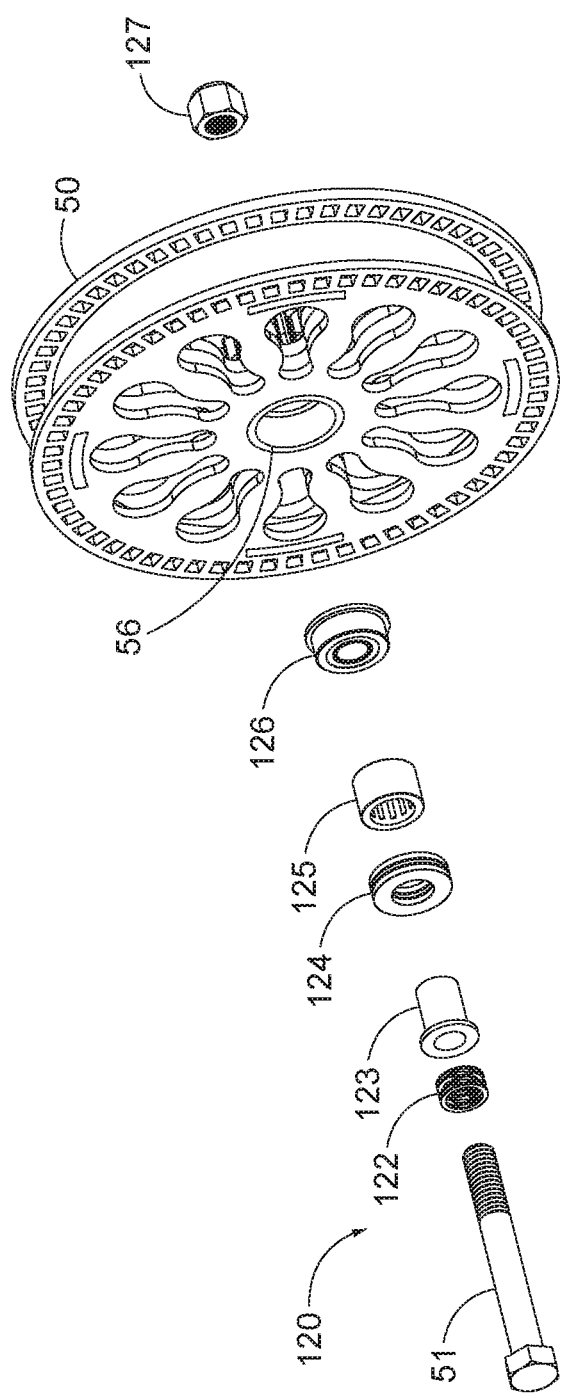
FIG. 21 is an exploded perspective view of the tension clutch mechanism of the reel of the measurement device of FIG. 1.

Referring to FIGS. 12 and 21, reel clutch mechanism 130 is an assembly generally comprising the following in one non-limiting embodiment: reel shaft 51 which may be a bolt which holds the assembly together, compression spring 122, step bushing 123, thrust bushing or bearing 124, collar rolling bearing 125, a front ball bearing 126, and threaded nut 127. An additional rear ball bearing 126 shown in FIG. 21 is used to rotatably mount the inboard arm 104 to the reel shaft 51. The reel clutch mechanism assembly fits inside central hub opening 56 of reel 50 except for the enlarged tooling head of the shaft 51 and the nut 127. Rotating and tightening down the bolt compresses the spring 122, which sets the desired tension setpoint described above to actuate feed out of measuring line 61 from the reel. Compression spring 122 may be a wave spring as shown in one embodiment, but could be any version of a compression spring suitable for this purpose. The spring allows the shaft 51 to increase the tension force smoothly as the spring compresses and becomes more compact.

Step bushing 123 carries axial load to the thrust bearing, and radial load to the one way roller bearing 125. The thrust bearing 124 allows smooth rotation with a thrust load applied. The preferably one way roller bearing 125 allows smooth rotation in one direction with a torque applied, and locks when torque is applied in the opposite direction via rotation of reel 50. Ball bearing 126 allows smooth rotation when loads are applied in all directions and is used to support the back or rear half of the reel 50 to provide two points of contact. The nut 127 on the rear side of the reel is used to set the initial compression of the spring 122.

Operation of the reel clutch mechanism 130 allows the following movement. In one rotational direction (string wind up): the ball bearing moves freely on one half of the reel 50. On the other side, the roller bearing and thrust bearing both move freely as well, and therefore the reel spins with little effort. In the other rotational direction (string feed): the ball bearing moves freely on one half of the wheel if measuring line 60 is pulled out by use of the measurement device 40. On the other side, the thrust bearing moves freely, but the roller bearing locks. This forces the step bushing to slide with respect to the compression spring. Therefore, the reel moves, but at a harder amount with greater resistance based on the compression of the bolt, and thereby the spring.

Suitable metallic or non-metallic materials may be selected for constructing the measurement device 40 and its components. In one non-limiting example, the reel 50, gears 55, 111, and 71, tension arm assembly 101, pulley wheels 65, and frame 41 may be made of plastic. The reel gear 55 may be integrally molded with the reel body. The remaining components may be made of metal (e.g. shafts, bolts, nuts, bearings, etc.).

FIGS. 14-20 and 22 show the routing path P of measuring line 61 through the array of measurement device pulley wheels 65, reel 50, encoder shaft 91, and guide element 82. It bears noting that measuring line may be routed from the fixed pulley 80 of the measurement portion 49 of measurement device 40 to either the translatable pulley 102 or fixed tension pulley 103 of the tension mechanism. In some embodiments, the measuring line may be wound at least twice around pulleys 102, 103 for reasons previously describe herein. The measuring line 61 may also be wound around pulleys 102, 103 in either direction (i.e. clockwise or counter clockwise as viewed in FIG. 14, and alternatively may be wound in a crisscross manner in some embodiments.

In some embodiments, the uppermost fixed pulley 80 of the measurement portion 49 of measurement device 40 may be eliminated leaving only the lowermost fixed pulley 81 of the measurement portion. In such a case, the function of fixed pulley 80 which maintains tension of the measuring line 61 around the encoder shaft 91 in conjunction with fixed pulley 81 is replaced by the multi-stack fixed tension pulley 103 of the spring-biased tension mechanism. Pulley 103 may either maintain its original position as shown (see, e.g. FIG. 14), or be shifted to assume the position vacated by fixed pulley 80.

Measurement device 40 further includes a mounting block 140 attached to the rear major surface 43 of the support frame 41. Mounting block 140 is used to attach the measurement device to a hand-held support structure 151 to performing plant spacing measurements in the agricultural field. In one, the mounting block may be configured for mounting the frame to support structure comprising an elongated pole 150 shown in FIG. 22. Pole 150 may have any suitable cross-sectional shape such as circular, or other. Mounting block 140 may comprise a split clamp device as shown with two rectilinear shaped half sections 143 and fasteners 141 for tightening the half sections together against pole 150 received through a central passage 142. Numerous other configurations of mounting blocks or mounting provisions are possible depending upon the type of support structure to be used.

Support structure 151 provides a complete measurement tool 153 of the spatial measurement system 20 when combined with measurement device 40 for obtaining plant spacing measurements in the field. Support structure 151 may further include one or more handles 152 for handling and maneuvering the tool. A further guide element 154 may be mounted proximate to or at the bottom terminal end of the pole 150. The guide element 154 changes direction of the measuring line 61 from vertical as delivered by guide element 82 on measurement device 40 to horizontal for making horizontal field measurements. An eye hook may be used for guide element 154 similarly to element 82, or another type of suitable guide for a measuring line such as a collar, sleeve, pulley wheel, or other apparatus may be used.

The hand-held support structure 151 may also be used for mounting the previously noted programmable controller 95 of the system thereto. Controller 160 is operably linked to the encoder 90 and its circuitry for receiving plant spacing measurement data transmitted by the encoder and collected in the agricultural field by the user employing the support structure and measurement device 40. Controller 95 is configured via program instructions or software to convert incremental rotation of the encode shaft 91 into a linear distance measurement in the field between plants. Controller 95 may be communicably linked to encoder 90 by wired means or any suitable wireless protocol such as for example without limitation Bluetooth, Near Field Communication (NFC), WiFi, or other. Controller includes a microprocessor and user interface which may be a keypad, touchscreen graphic user interface, or a combination thereof.

The measurement device controller 95 further includes non-transitory tangible computer readable medium operably coupled and accessible to the controller. The computer or machine accessible and readable medium may include any suitable volatile memory and non-volatile memory or devices operably and communicably coupled to the controller processor(s). Any combination and types of volatile or non-volatile memory may be used including as examples, without limitation, random access memory (RANI) and various types thereof (e.g. ferroelectric RAM, DRAM, etc.), read-only memory (ROM) and various types thereof, hard disk drives (HDD), solid-state drives (SSD), flash memory, SD card, USB drive, or other suitable memory and devices which may be written to and/or read by the processor operably connected to the medium. The non-volatile memory may thus be any permanent or removable type memory. Both the volatile memory and the non-volatile memory are used for saving data or results from processed samples, for storing programming (program instructions or software), and storing operating parameters associated with operation of the measurement device and/or processing measurement data, or other information. Both the volatile memory and the non-volatile memory may be used for storing the program instructions or software.

The computer or machine accessible and readable non-transitory medium (e.g. memory) contains executable computer program or software instructions which when executed by the measurement device controller 95 cause the system to perform operations or methods of the present disclosure including measuring properties and testing of soil water sample. The term machine accessible and readable non-transitory medium (e.g., memory) should be construed to include a single medium or multiple media (e.g., a centralized or distributed database, and/or associated caches and servers) that store the one or more sets of control logic or instructions. It is well within the ambit of one skilled in the art to provide and configure a controller with all the required appurtenances to provide a fully functional control system for operating the probe sampling system and processing soil water samples in the manner disclosed herein.

The probe controller 95 may further include a GPS module which allows the controller to know its precise geo-coordinates when used in the agriculture field.

It bears noting that the measurement device controller is configured to include all other usual electronic appurtenances and ancillary devices known in the art necessary to form a fully functional and programmable control system.

Figure 14:
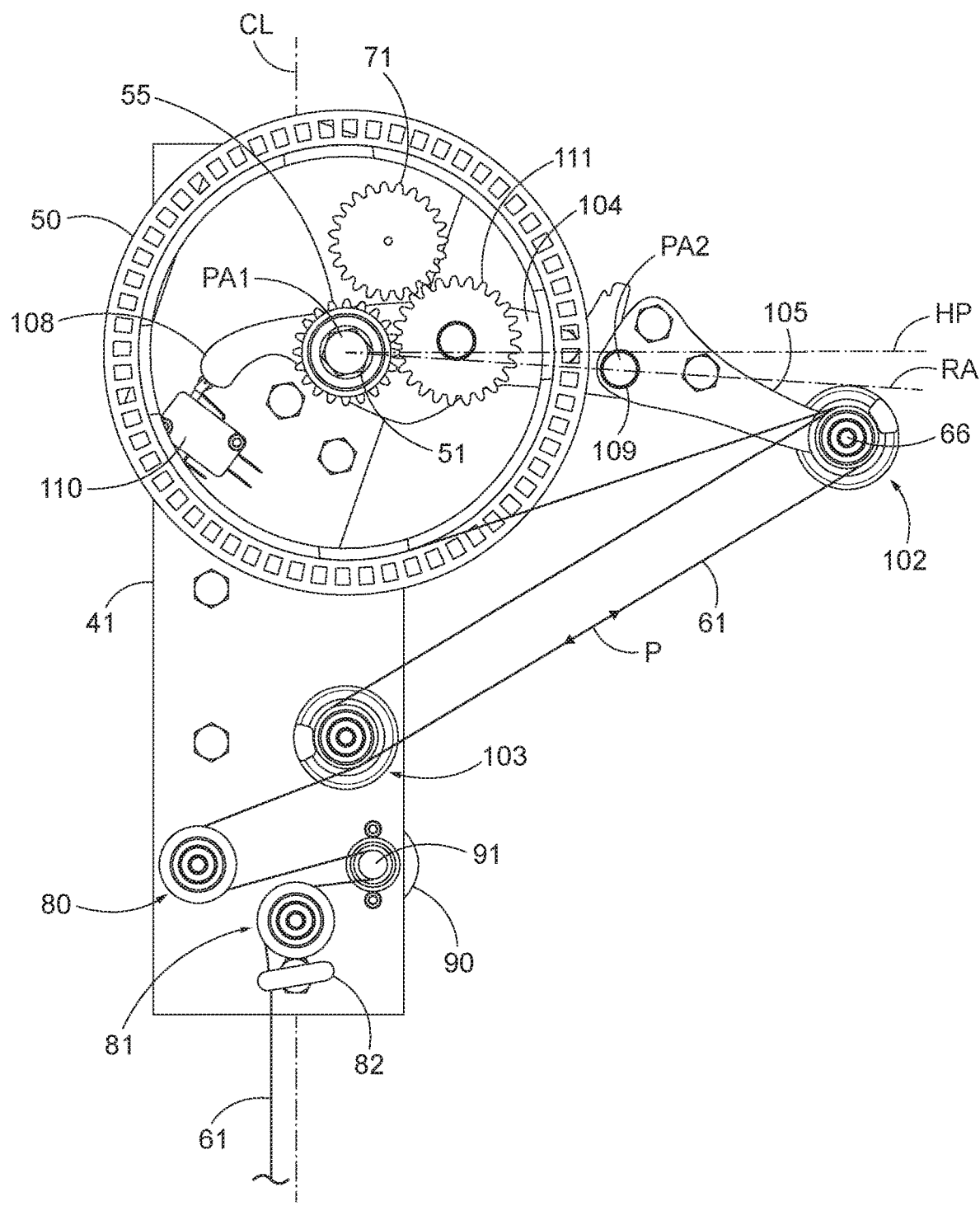
FIG. 14 is a front view thereof showing the routing path of the measuring line through the measurement device.

FIG. 14 shows the routing path P of measuring line 41 through measurement device 40 from reel 50 at top through the dispensing guide element 82 at bottom. As seen, measuring line 61 is wound around translatable pulley 102 and fixed tension pulley 103 several times. Line 61 is preferably further wound around encoder shaft 91 at least 360 degrees, and preferably more to ensure positive engagement therebetween to rotate the shaft for detecting plant spacing measurements as the measuring line is fed out.

An exemplary process and method for using measurement device 40 will be now be briefly described with reference to FIGS. 15-20 which are sequential views in the measuring line rewind process. Reference is also made to FIG. 22 which shows the measurement device 40 deployed in the field to obtaining plant spacing measurements.

For convenience of reference in describing and illustrating the movement of the inboard and outboard arms 104, 105 of tension arm assembly 101 in response to changes in the tension of measuring line 61 during the process of rewinding the measuring line onto the reel, a tension arm reference axis RA is provided. Axis RA intersects both reel shaft 51 which defines a first pivot axis PA1 about which inboard arm 104 and concomitantly the entire tension arm assembly 101 rotates, and pivot shaft 109 at articulated joint 112 which defines a second pivot axis PA2 about which outboard arm 105 rotates relative to the inboard arm. Axis RA moves up and down concomitantly with the movement of the inboard arm 104 through various upwardly positive and downwardly negative angular positions relative to a stationary horizontal reference plane Hp as the tension in measuring line 61 varies during the rewind process. Horizontal reference plane Hp is perpendicular to vertical centerline CL of measurement device 40, and extends through and intersects pivot axis PA1 of the reel as shown. Outboard 105 assumes various angular positions relative to axis RA and horizontal reference plane Hp, as further described below.

To obtain plant spacing measurements, the user first implants a stake S in the ground or soil 155 at a first end of the crop row as shown in FIG. 22. The measuring line 61 is fixedly attached to stake S. Because the encoder 90 measures incremental distances between plants, it bears noting that the stake need not be implanted directly into the soil at the location of the first plant 156 in the crop row as shown.

Figure 15:
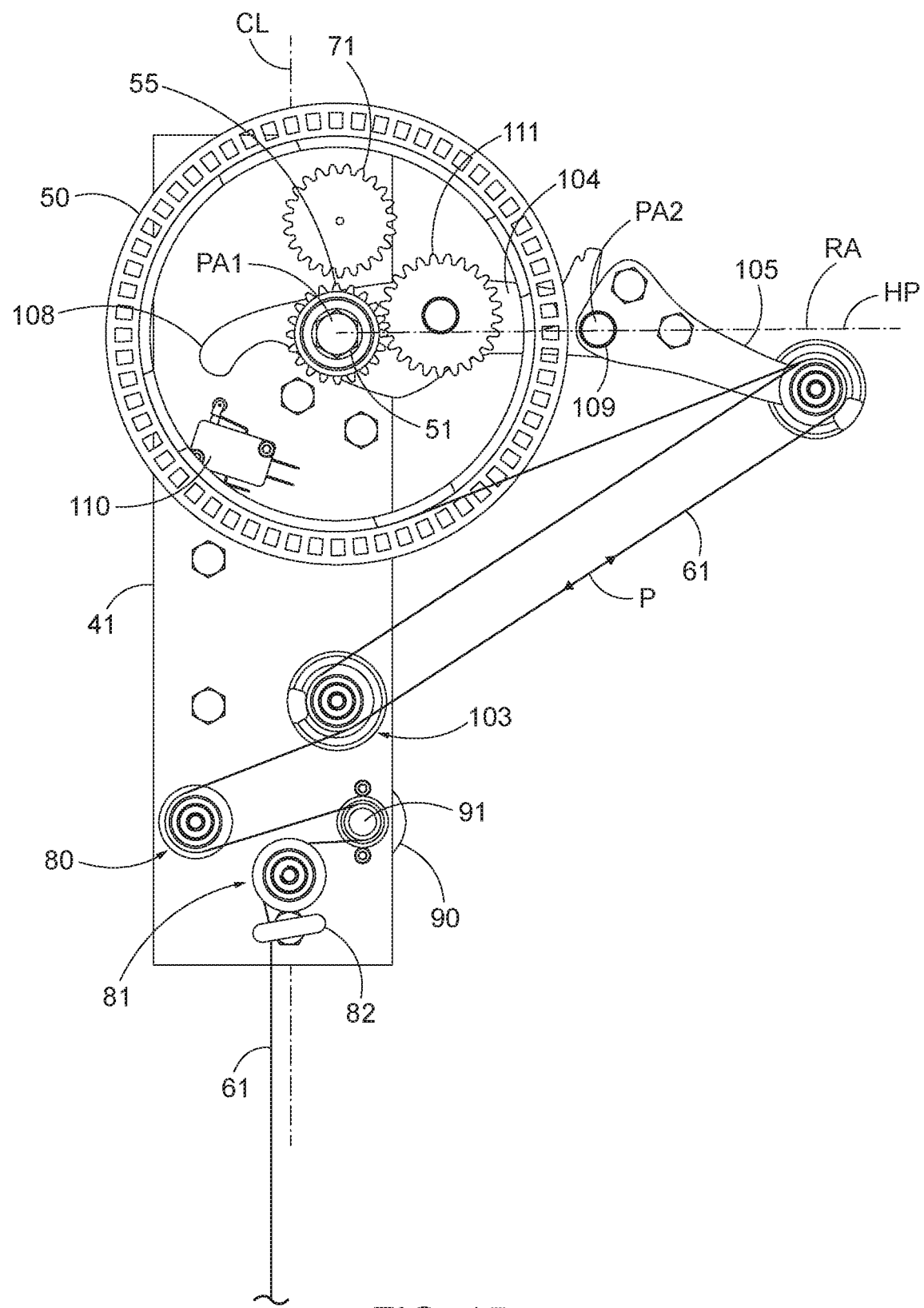
FIG. 15 is a first of a series of sequential views showing a first operating position of the tension arm assembly.

Referring now to FIG. 15, with stake S implanted, the tension arm assembly 101 of the measurement device tension mechanism 100 is shown in a "natural" state of equilibrium with the arm assembly in a first position. The measuring line 61 may be taut with slight tension or tension force, but at this point in the process line is not being pulled out by the user and unwound from reel 50 yet. Translatable pulley 102 is angled relative to and below both horizontal reference plane Hp and tension arm reference axis RA as shown in the natural state due to the biasing action of the arm joint spring 106 and outboard arm spring 115 which applies a moderate degree of tension to measuring line 61 (even when not being unwound from the reel). Reference axis RA may be substantially parallel to horizontal reference plane Hp; the plane Hp intersecting both inboard and outboard arms 104, 105 as shown since the inboard arm is substantially horizontal. It bears noting that the actuating extension 108 of inboard arm 104 is not contacting the motor actuator 110 and shuttle gear 111 of the outboard arm is not engaged with the motor gear 71. Motor 70 is therefore in an "off" state. In addition, the travel stop 113 on outboard arm 105 is not engaged with the stop surface 114 on inboard arm 104 at the articulated joint 109.

Next, to start taking plant spacing measurements, the user begins to move down the crop row with the hand-held support structure 151 (on which measurement device 40 is mounted) in the direction of travel shown by the arrow in FIG. 22. Measuring line 61 is being pulled by the user upon moving down the crop row to the first plant 156 encountered (left one shown), thereby creating a tensile force in the line which acts in the opposite downward direction than the upward biasing direction of tension arm related springs 106 and 115 noted above. The tension produced in the measuring line 61 is greater than the natural state of equilibrium and high enough to overcome the preselected manually adjusted tension force setpoint created by reel clutch mechanism 120 necessary to rotate the reel 50 to dispense measuring line. Reel 50 rotates in a first direction (clockwise in FIGS. 15-20 and 22) to release and pay out measuring line 61 as the user moves the hand-held support structure 151 down the crop row.

Figure 16:
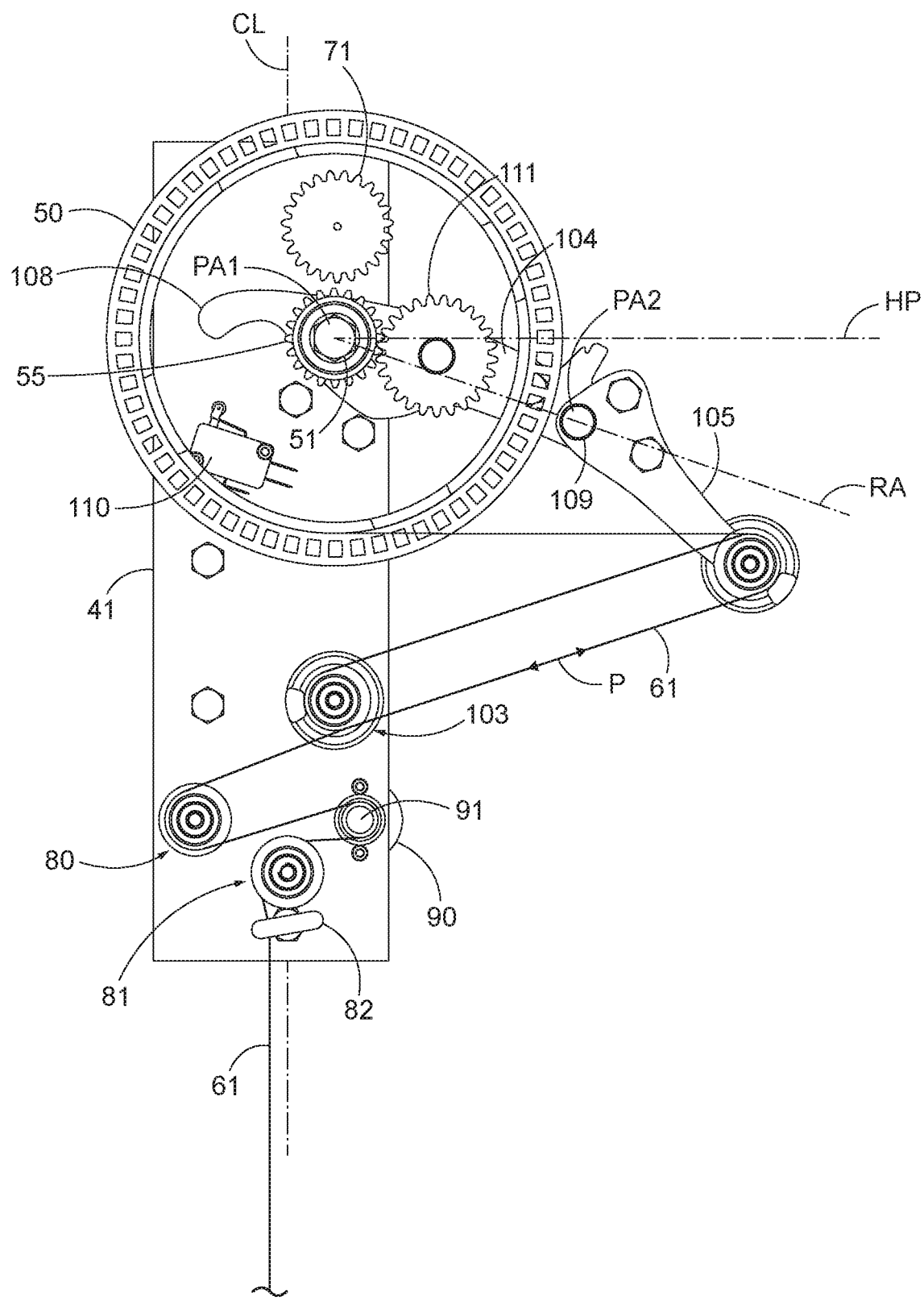
FIG. 16 is a second sequential view showing a second operating position thereof.

The greater tension or tension force now created in the measuring line 61 by pulling line off the reel 50 causes the tension arm assembly 101 of tension mechanism 100 to assume the position shown in FIG. 16. This may be referred to as a "switch disengage position" as the motor actuator 110 switch is not engaged by the actuating extension 108 of inboard arm 104 yet. The entire tension arm assembly 101 rotates farther downwards below horizontal reference plane Hp including the arm joint 112, as shown than in FIG. 15. The tension arm reference axis RA is acutely angled to and below horizontal reference plane Hp. The outboard tension arm 105 is angled to axis RA thereby positioning translatable pulley 102 below this axis. The entire outboard arm 105 may be positioned below horizontal reference plane Hp. Actuating extension 108 of inboard tension arm 104 remains disengaged from the motor actuator 110 at this point as measuring line 61 starts to unwind from the reel 50. Motor 70 is therefore still in an "off" state. Shuttle gear 111 of the outboard arm also remains disengaged from the motor gear 71.

Once the user reaches the first plant 156 (left one in FIG. 22), the user stops and inputs the position in controller 95 via the user interface to initialize the measurement process. Controller 95 detects and stores a first rotational position of encoder shaft 91 in memory. This sets a first datapoint for starting plant spacing measurements. The user then continues down the crop row in the direction of travel to the second plant 156 encountered (right one in FIG. 22). The forgoing process is repeated to determine a second rotational position of encoder shaft 91 via controller 95. Controller 95 compares the first and second rotational positions of encoder shaft 91. The change in rotational positions of encoder shaft 91 based on the comparison is used by the controller 95 to convert the shaft rotational movement into a linear distance D1 representing the spacing between the first and second plants. The process continues and is repeated for each plant in the crop row to determine their spacing. This process may also be performed for distances between plants in different crop rows if desired.

Once measurements are completed, as the user then begins to move back in the opposite direction from the direction of travel arrow shown in FIG. 22 (i.e. back towards stake S at left), a reduction in tension of the measuring line 80 occurs as it is no longer being held taut. The measuring line retraction or windup process is automatically triggered by tension mechanism 100 to retrieve and rewind line back onto the reel 50 while simultaneously re-establishing tension in the line. The inboard and outboard arms 104, 105 of tension mechanism 100 both move or oscillate in conjunction back and forth between the "natural" equilibrium state shown in FIG. 15 and a "gear engage" position shown in FIG. 17 freely, thereby allowing the spring biases of tension arm assembly 101 to maintain tension on the measuring line 61 without rewind assistance from the motor 70 for a short return distance (e.g. about 2 feet of reverse travel). The biasing action of inboard arm spring 115 pulls inboard arm 104 back upwards far enough to engage the shuttle gear 111 with motor gear 71 without actuating the motor actuator 110. The inboard arm actuating extension 108 may make initial slight contact motor actuator 110, but not sufficient to fully actuate the actuator and start the motor. It bears noting that tension arm related springs 106 and 115 entirely control spring tension in measurement device 40 at this point.

Figure 17:
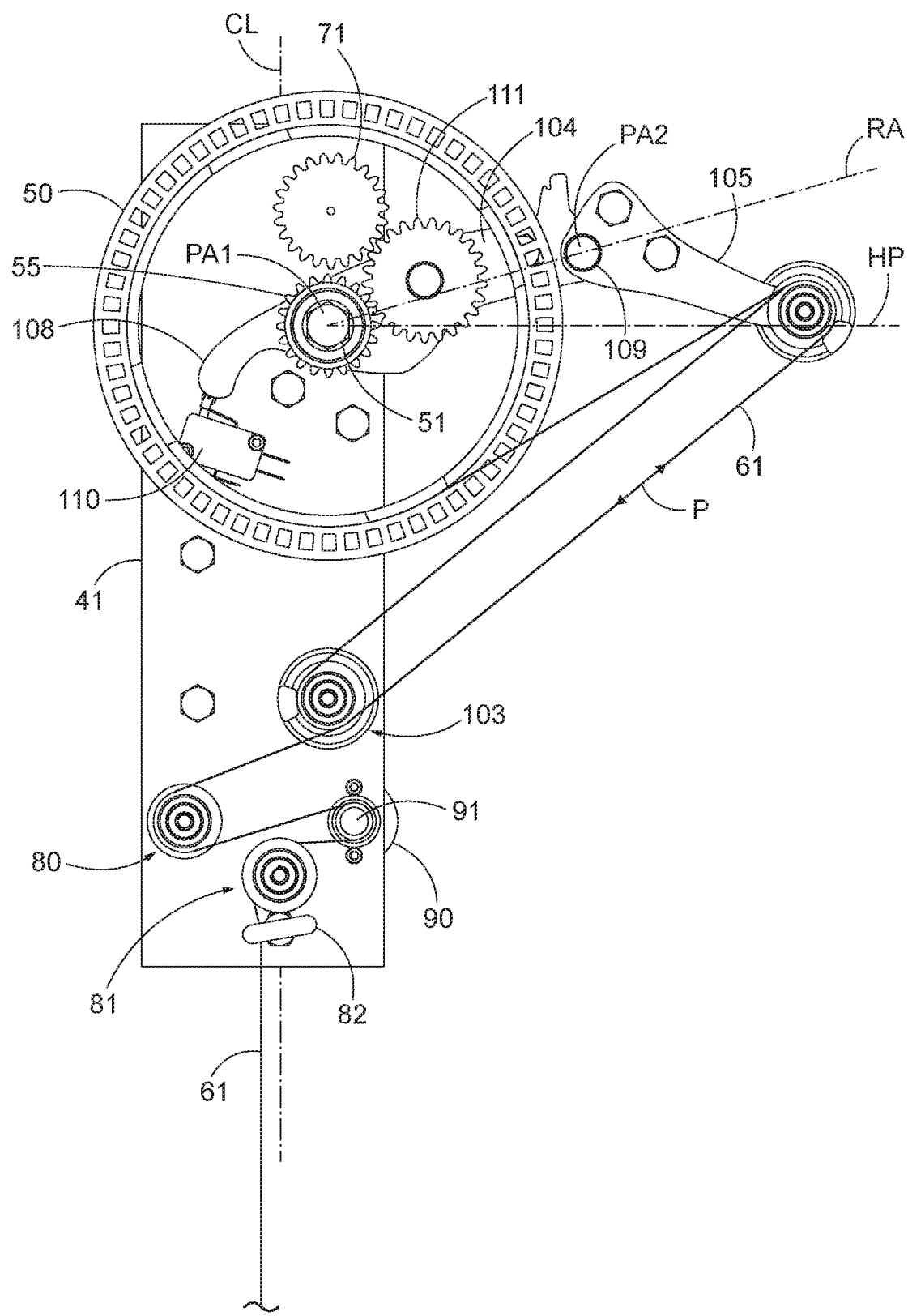
FIG. 17 is a third sequential view showing a second operating position thereof.

In the "gear only engage" position of the tension arm assembly 101 in FIG. 17, the distal end portion of the inboard arm and arm joint 112 has now moved above horizontal reference plane Hp. Outboard arm 105 is acutely angled to and below tension arm reference line RA, but a majority of the arm may be above horizontal reference plane Hp. The translatable pulley 102 on arm 105 may be proximate to and intersect reference plane Hp.

Figure 18:
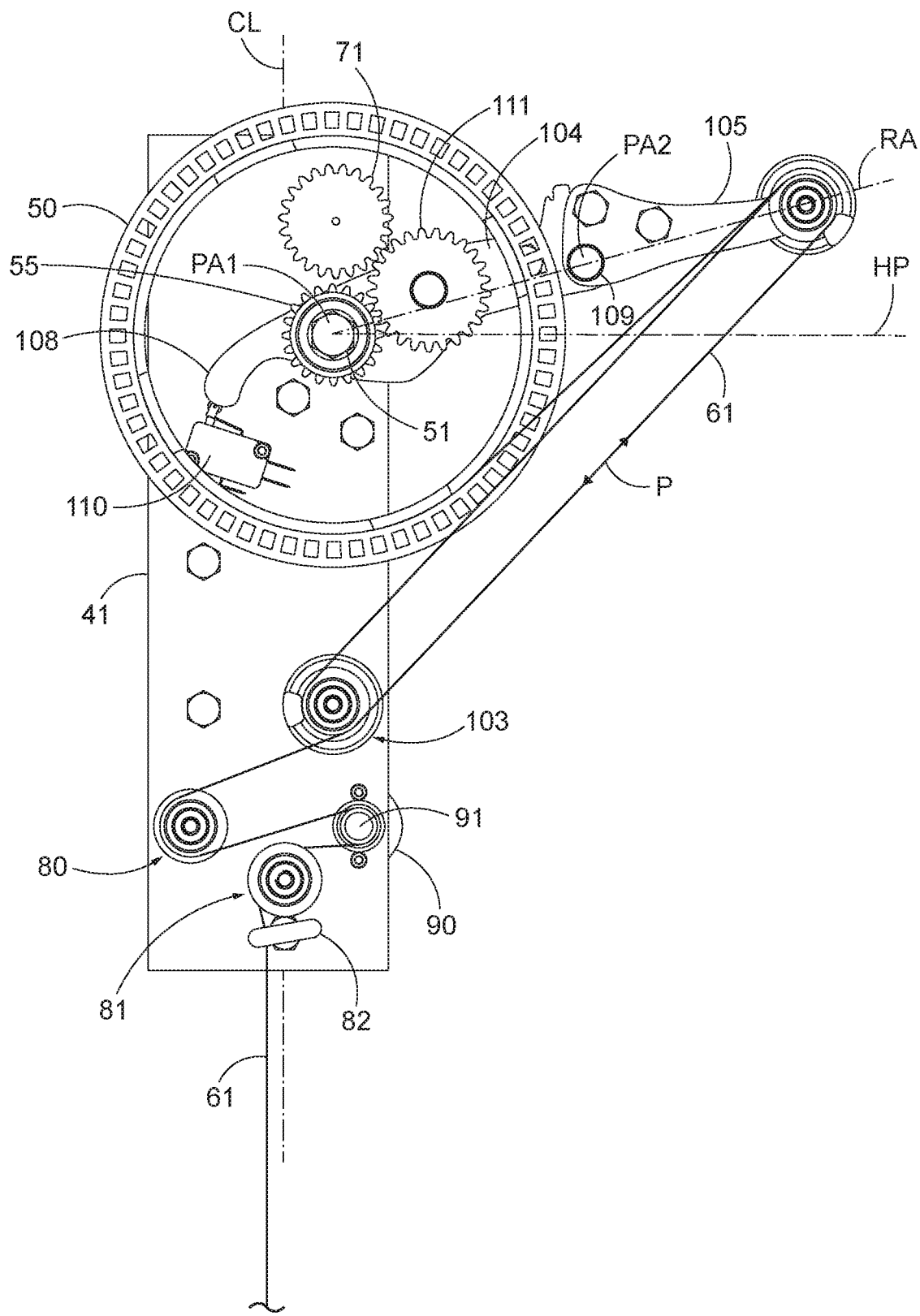
FIG. 18 is a fourth sequential view showing a second operating position thereof.

If the tension mechanism 100 is in "gear engage" position of FIG. 17, and the mechanism wants to pull in more measuring line 61, the inboard arm 104 rotates farther back upwards to a "switch engage" position shown in FIG. 18.

The actuating extension 108 of inboard arm 104 now fully engages and activates the motor actuator 110, which in turn starts motor 70. With the gear train already substantially engaged and ready for operation in FIG. 17, motor 70 operably coupled to reel gear 55 via the shuttle gear 111 rotates reel 50 in a clockwise direction in FIG. 18 to retrieve and rewind measuring line 61. The arm assembly 101 is substantially erect with the articulated arm joint 112 fully extended such that the translatable pulley 102 may intersect tension arm reference axis RA as shown. The entire arm assembly is above horizontal reference plane Hp.

Figure 19:
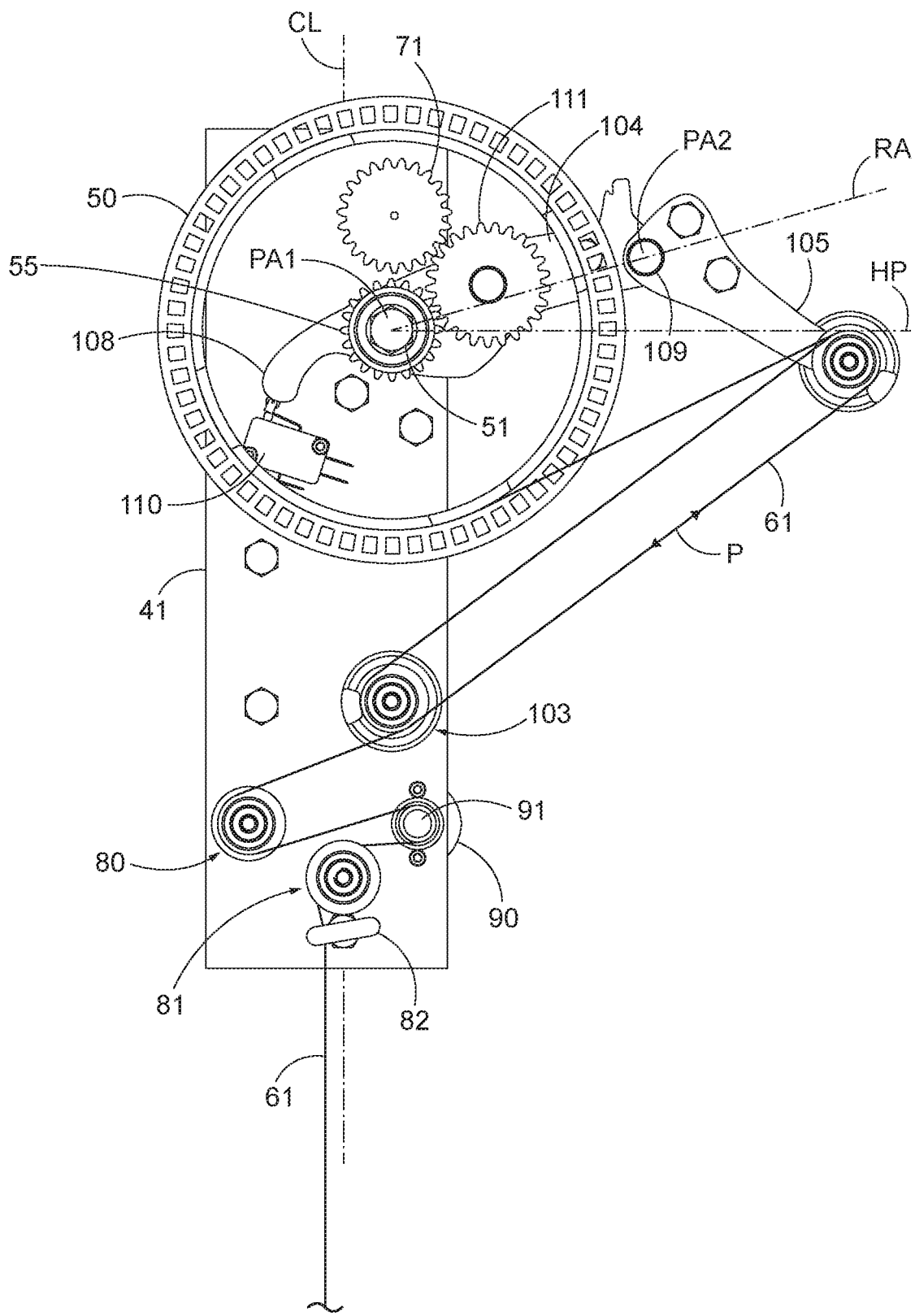
FIG. 19 is a fifth sequential view showing a second operating position thereof.

Operation of motor 70 causes, the drive gear train to windup the wheel, and the outboard arm 105 rotates downward at an acute angle to and below tension arm reference axis RA. The translatable pulley 102 on the angled arm 105 may be at or just below horizontal reference plane Hp. The tension arm assembly 101 assumes what may be referred to as an initial "motor run some" position as shown in FIG. 19.

Figure 20:
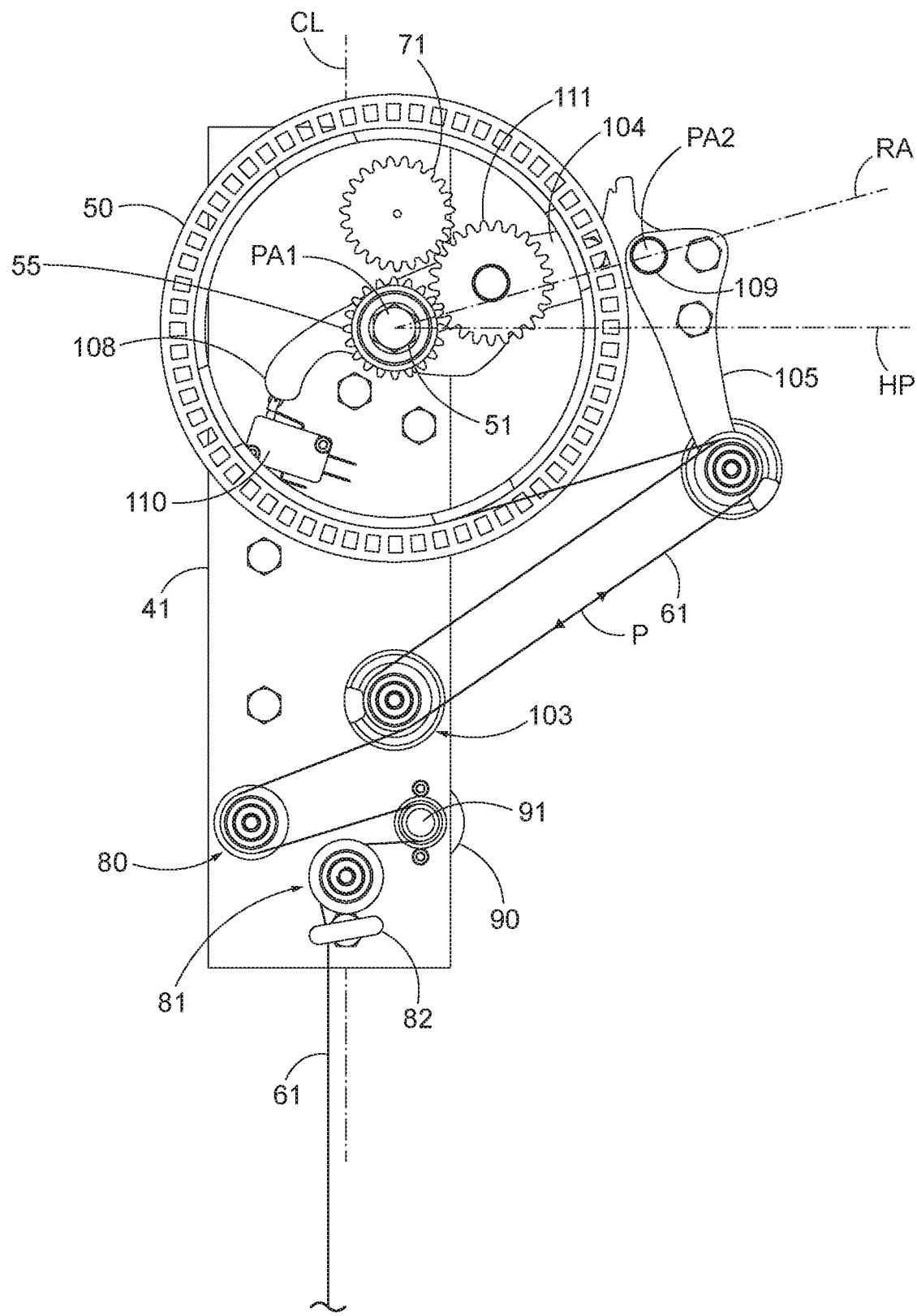
FIG. 20 is a sixth sequential view showing a second operating position thereof.

Eventually, the tension arm assembly 101 transitions to what may be referred to as a "motor run more" position shown in FIG. 20 during the measuring line 61 rewind process. Outboard arm 105 is angled downwards in an almost vertical position as shown and may be oriented substantially perpendicular to tension arm reference axis RA. The inboard 104 is substantially maintained at about the same upward position as in FIG. 19 by inboard arm spring 115; the uppermost position of the inboard arm being limited by the meshing engagement between the shuttle gear 111 and motor gear 71. It bears noting that when motor 70 is actuated, the outboard arm 105 may oscillate or fluctuate between the positions shown in FIGS. 18-20 and therefore is providing all the motion of the tension arm assembly as measuring line is rewound back onto the reel 50. The measuring line tension is set by outboard arm 105 as well as the reel 50 winding up. Commonly if the state becomes as shown in FIG. 20, it is for a short time, and joint 109 straightens some, thereby disengaging switch 110, which stops the motor)

At approximately this point in the measuring line 61 rewind process, the spring 106 bias on the outboard arm 105 is disproportionate to and overpowers the spring 115 bias of the inboard arm 104. The springs equalize in spring force, and tension arm assembly 101 resumes the "switch disengage" position of FIG. 16 which substantially straightens the tension arm assembly 101 out. The inboard arm shuttle gear 111 disengages the motor gear 71, and the motor 70 stops due to the motor actuator 110 becoming simultaneously disengaged from the actuating extension 108 of the inboard arm 104 which has rotated back downwards.

As a general observation, it bears noting in FIGS. 15-20 that the linear distance between pulleys 102 and 103 changes as the tension arm assembly 101 moves through the various positions shown to maintain tension on the measuring line 61.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:
1. A system for measuring spatial relationships between objects comprising:
  a frame;
  a reel rotatably mounted to the frame;
  a length of a flexible measuring line wound around the reel, the reel rotatable in opposing direction to rewind or pay out the measuring line;
  a measurement assembly comprising at least one fixed pulley and an encoder comprising an encoder shaft, the measuring line extending around the at least one fixed pulley and encoder shaft in operable engagement; and a self-adjusting tension mechanism arranged between the reel and measurement assembly, the tension mechanism engaging the measuring line and movable to maintain tension on the measuring line when the measuring line is rewound onto the reel.

2. The system according to claim 1, wherein the measurement assembly is disposed at a first end of the frame and the reel is disposed at an opposite end of the frame.

3. The system according to claim 1, wherein the tension mechanism comprises a spring biased tension arm assembly including a translatable pulley operably engaged by the measuring line.

4. The system according to claim 3, wherein the translatable pulley is arranged in the measuring line routing path between the reel and the at least one fixed pulley of the measurement assembly.

5. The system according to claim 3, wherein the translatable pulley is disposed on a distal terminal end of the arm assembly and a proximal portion of the arm assembly is pivotably coupled to the frame.

6. The system according to claim 5, wherein the proximal end of the arm assembly is coupled to the frame between a front major surface of the frame and the reel.

7. The system according to claim 3, wherein the tension arm assembly comprises a first inboard arm coupled which is coupled to the frame and a second outboard arm pivotably coupled to the inboard arm and movable relative thereto.

8. The system according to claim 7, wherein the translatable pulley is mounted to the outboard arm.

9. The system according to claim 3, wherein the translatable pulley is an assembly comprising a stack of multiple pulleys, and wherein the measuring line is wound around at least two pulleys in the stack.

10. The system according to claim 3, wherein the tension mechanism further comprises a second fixed tension pulley mounted to the frame arranged between the translatable pulley and the at least one fixed pulley of the measurement assembly in the measuring line routing path.

11. The system according to claim 10, wherein the second fixed tension pulley of the tension mechanism is an assembly comprising a second stack of multiple pulleys, and wherein the measuring line is wound around at least two pulleys in the second stack.

12. The system according to claim 3, wherein the tension arm assembly is angularly movable between an inward collapsed position proximate to the frame and an outward extended position distal to the frame.

13. The system according to claim 12, further comprising a spring mounted to the arm assembly, the spring biasing the arm assembly outwards towards the extended position in a direction away from the measurement assembly.

14. The system according to claim 3, further comprising a motor selectively coupleable to the reel and operable to rotate the reel and retrieve the measuring line.

15. The system according to claim 14, wherein the motor is selectively coupled to the reel by a gear train comprising a shuttle gear mounted to and movable with the tension arm assembly.

16. The system according to claim 1, wherein the measurement assembly further includes a guide member through which the measuring line passes and extends outwards beyond the frame for obtaining distance measurements.

17. The system according to claim 1, wherein the measurement assembly further includes a second fixed pulley arranged in the measuring line routing path between the at least one fixed pulley and the guide member.

18. The system according to claim 1, wherein the frame comprises a substantially flat plate-like body having two opposing parallel major surfaces.

19. The system according to claim 1, wherein the reel includes a reel clutch mechanism, the reel clutch mechanism adjustable by a user to set a tension force setpoint for reel that must be overcome in order to rotate the reel and pull a length of the measuring line out from the reel.

20. The system according to claim 1, further comprising a mounting block attached to the frame and configured to mount the frame to a portable support structure for use in measuring the spatial relationships between the objects.

21. The system according to claim 1, further comprising a controller including a microprocessor and user interface, the controller operably and communicably coupled to the encoder for receiving measurement data from the encoder.

22. A system for measuring spatial relationships between objects comprising:

a vertical centerline;

a frame;

a reel rotatably mounted to the frame;

a length of a flexible measuring line wound around the reel, the reel rotatable in opposing direction to retrieve the measuring line or dispense the measuring line on demand;

a measurement assembly comprising at least one fixed pulley and an encoder comprising an encoder shaft, the measuring line wrapped around the at least one fixed pulley and encoder shaft in operable engagement therewith; and a movable self-adjusting tension arm assembly arranged between the reel and measurement assembly in a measuring line routing path, the tension arm assembly comprising an inboard arm pivotably mounted to the frame and an outboard arm pivotably coupled to inboard arm at an articulated joint and movable relative thereto;

the tension arm assembly comprising a translatable pulley mounted to and movable with the outboard arm;

a fixed tension pulley cooperating with the tension arm assembly and mounted to the frame;

a first spring biasing the tension arm assembly in a direction away from the encoder;

the measuring line extending from the at least one fixed pulley of the measurement assembly to the translatable pulley or the fixed tension pulley;

wherein the tension arm assembly is movable in a plurality of positions dependent upon variations in tension of the measuring line when the measuring line is retrieved by the reel.

23. A method for maintaining tension in a distance measuring device, the method comprising:

providing a measurement device comprising a frame including a rotatable reel around which a length of a measuring line is wound, a motor comprising a motor gear selectively coupleable to a reel gear for rotating the reel, an encoder comprising an encoder shaft, and a pivotably movable spring-biased tension arm assembly;

routing the measuring line in order from the reel and operably engaging a translatable pulley mounted to the tension arm assembly, a fixed tension pulley mounted to the frame, and the encoder shaft;

moving the measurement device in a first linear direction;

applying a first tension force to the measuring line;

unwinding measuring line from the reel which rotates in a first feed direction;

rotating the tension arm assembly in a first direction towards the encoder in response to the first tension force;

moving the measurement device in a second linear direction opposite to the first linear direction which decreases the first tension force;

automatically rotating the tension arm assembly in a second direction away from the encoder via spring force in response to decreasing the first level of tension;

coupling the motor gear to the reel gear; and rotating the reel in a second rewind direction via operation of the motor to retrieve measuring line.

24. A method for maintaining tension in a distance measuring device, the method comprising:

providing a measurement device including a rotatable reel around which a length of a measuring line is wound, a motor comprising a motor gear selectively coupleable to a reel gear for rotating the reel, an encoder comprising an encoder shaft operably engaging the measuring line, and a pivotably movable spring-biased tension arm assembly operably engaging the measuring line;

pulling a length of measuring line from the reel, wherein a first tension force is created in the measuring line acting in a line feed direction;

forming slack in the measuring line which decreases the first tension force;

rotating the tension arm assembly in a line retract direction opposite to the line feed direction;

the tension arm assembly creating a second tension force in the measuring line;

activating a motor operably coupled to the reel via rotating the tension arm assembly; and rewinding measuring line back onto the reel via motor power.

\* \* \* \* \*